United States Patent [19]

Best

[11] Patent Number: 4,569,026

[45] Date of Patent: * Feb. 4, 1986

[54] TV MOVIES THAT TALK BACK

[76] Inventor: Robert M. Best, 16016 9th NE., Seattle, Wash. 98155

[ * ] Notice: The portion of the term of this patent subsequent to Dec. 8, 1998 has been disclaimed.

[21] Appl. No.: 666,921

[22] Filed: Oct. 31, 1984

Related U.S. Application Data

[63] Continuation of Ser. No. 571,838, Jan. 19, 1984, abandoned, which is a continuation of Ser. No. 377,861, May 13, 1982, Pat. No. 4,445,187, which is a continuation of Ser. No. 159,141, Jun. 13, 1980, Pat. No. 4,333,152, which is a continuation-in-part of Ser. No. 136,100, Mar. 31, 1980, Pat. No. 4,305,131, which is a continuation of Ser. No. 9,533, Feb. 5, 1979, abandoned.

[51] Int. Cl.$^4$ .................. G11B 31/00; G06F 15/44; G10L 1/00
[52] U.S. Cl. .................................... 364/521; 340/725; 352/5; 358/102; 358/903; 364/410; 434/323; 381/43; 367/198
[58] Field of Search ............... 364/410, 415, 521, 900; 340/148, 725; 358/93, 102, 903; 360/72.2; 381/43, 51; 367/198

[56] References Cited

U.S. PATENT DOCUMENTS

| | | | |
|---|---|---|---|
| 3,601,530 | 8/1971 | Edson | 358/85 |
| 3,662,374 | 5/1972 | Harrison et al. | 381/48 |
| 3,721,757 | 3/1973 | Ettlinger | 360/72.2 |
| 3,742,143 | 6/1973 | Awipi | 381/43 |
| 3,747,087 | 7/1973 | Harrison et al. | 358/93 X |
| 3,778,058 | 12/1973 | Rausch | 340/725 X |
| 3,825,674 | 7/1974 | Justice | 434/307 X |
| 3,878,560 | 4/1975 | Ramage | 434/307 X |
| 3,883,850 | 5/1975 | Martin et al. | 381/43 |
| 3,928,724 | 12/1975 | Byram et al. | 381/43 |
| 3,939,579 | 2/1976 | Andrews et al. | 434/316 |
| 3,943,295 | 3/1976 | Martin | 381/43 |
| 3,946,157 | 3/1976 | Dreyfus | 381/43 |

(List continued on next page.)

OTHER PUBLICATIONS

Yasaki: Voice Recognition Comes of Age, Datamation, Aug. 1976, pp. 65–68.
Martin: One Way to Talk to Computers, IEEE Spectrum, May 1977, pp. 35–39.
Cavanagh: Educational Institutional Features of the Optical Videodisc System, Journal of the SMPTE, vol. 86, Apr. 1977, pp. 201–203.

(List continued on next page.)

*Primary Examiner*—Felix D. Gruber
*Attorney, Agent, or Firm*—Graybeal & Cullom

[57] ABSTRACT

A video entertainment system by which human viewers conduct simulated voice conversations with screen actors or cartoon characters in a branching story game shown on a television screen. The actors and cartoon characters reply responsively with lip-sync sound to words spoken by viewers. Different audio and video frames are generated from a videodisc and data memory to provide one of several alternative replies or alternative actions at each branch point in the game, depending on what the viewer says to a speech-recognition unit. A simple speech-recognition unit can be used because the number of words to be recognized at each branch point is restricted to just a few words. A menu of prompting words is displayed on a hand-held unit to inform viewers of what words they can use at each branch point. The prompting words are programmed to be phonetically distinct to be easily distinguishable from each other. Viewers can input questions or make other remarks by speaking a displayed code word which stands for a whole sentence. Pressing a button next to a sentence displayed on the hand-held unit may cause a recording of the displayed sentence to be played in lieu of a viewer speaking it. Viewers can chat with simulated images of famous people, call the plays in a ball game, make executive decisions as a king or general, and participate in simulated adventures with interesting game characters who respond to each viewer's words and answer back responsively.

36 Claims, 16 Drawing Figures

U.S. PATENT DOCUMENTS

| | | | |
|---|---|---|---|
| 3,960,380 | 6/1976 | Yokoi | 273/311 |
| 3,974,482 | 8/1976 | Balashov et al. | 364/900 |
| 3,987,484 | 10/1976 | Bosche et al. | 434/307 X |
| 4,016,540 | 4/1977 | Hyatt | 364/900 |
| 4,059,841 | 11/1977 | Bricot et al. | 358/128 |
| 4,060,915 | 12/1977 | Conway | 434/307 |
| 4,075,620 | 2/1978 | Passavant et al. | 364/521 X |
| 4,116,444 | 9/1978 | Mayer et al. | 364/521 X |
| 4,130,881 | 12/1978 | Haessler et al. | 364/415 X |
| 4,158,750 | 6/1979 | Sakoe et al. | 381/43 |
| 4,210,785 | 7/1980 | Huber | 360/72.2 X |

OTHER PUBLICATIONS

Wells: Random Selection and Brouching in the Godison Picture Audio Visual Field, Journal of the SMPTE, Nov. 1970, vol. 79, 983/990.

Suppes: The Use of Computers in Education, Scientific American, vol. 215, Sep. 1966, pp. 207/220.

Kenney: Special Purpose Application of the Optical Video-Disc System, IEEE Transcription on Consumer Electronics, Nov. 1976, pp. 327–338.

Disney: "Snow White and the Seven Dwarfs", 1979, Viking Press, New York, pp. 11, 18-19, 134 (Magic Mirror sequences).

Finch: "The Art of Walt Disney", Abrams, New York, 1975, pp. 65–68.

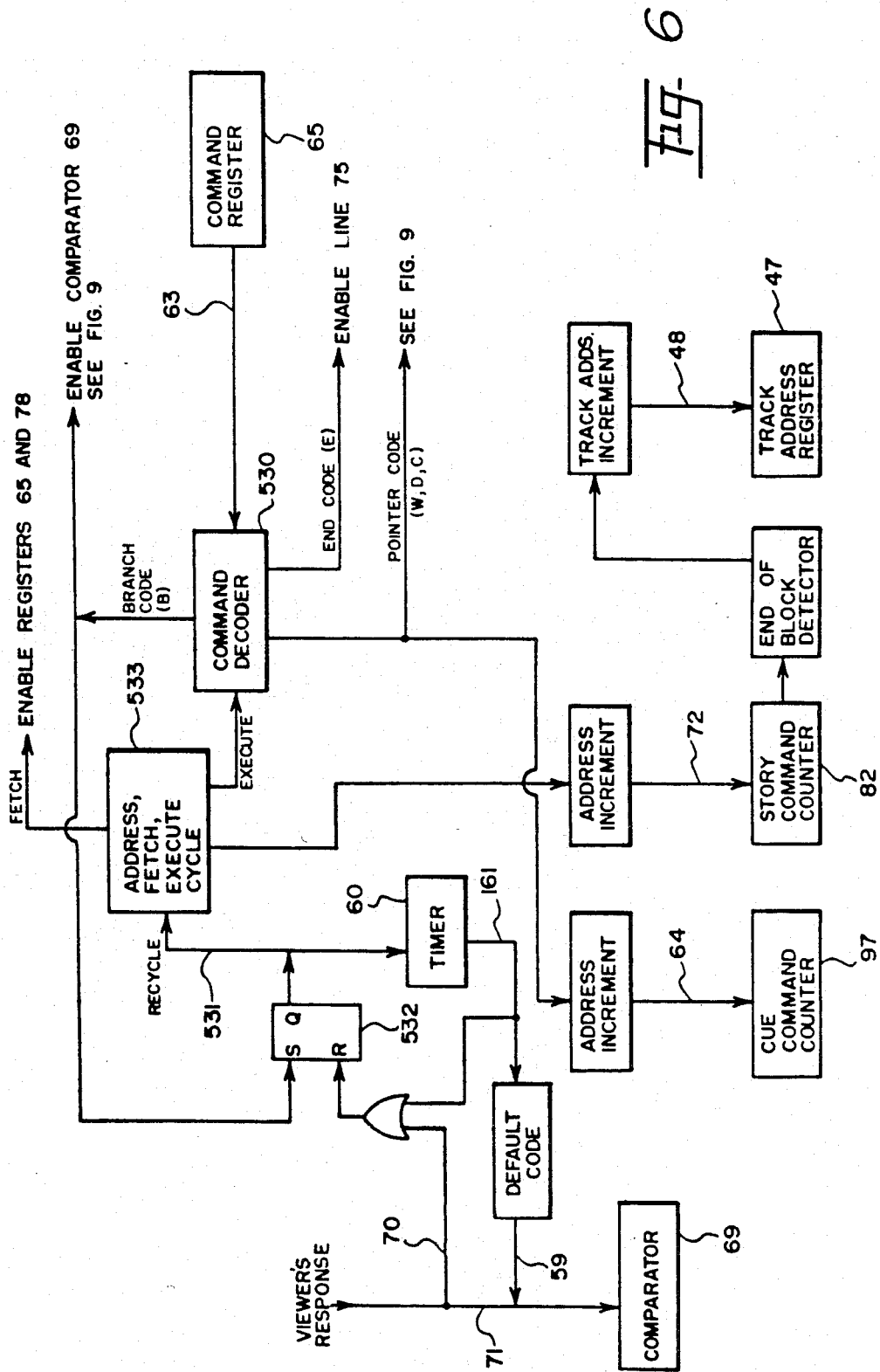

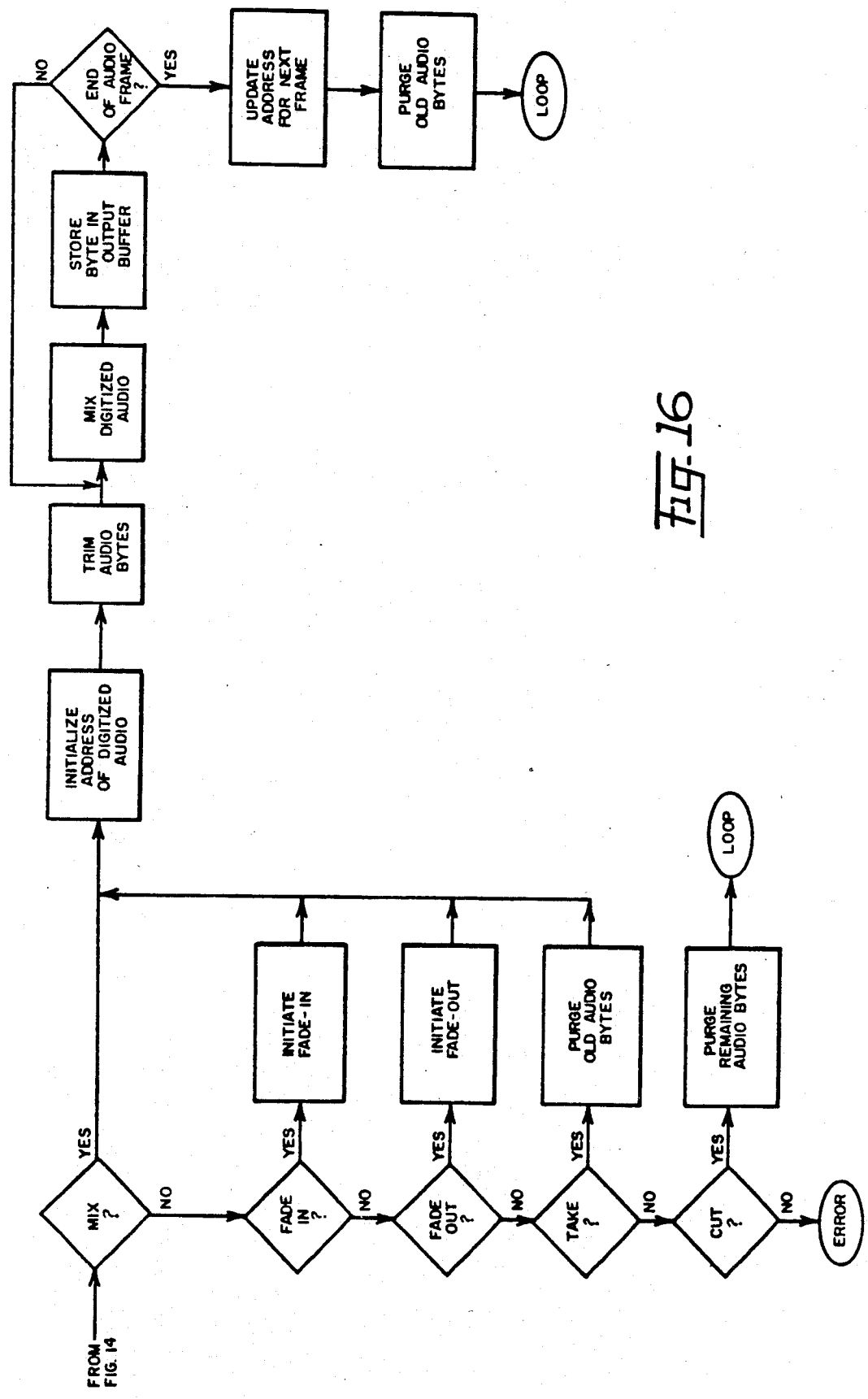

TV MOVIES THAT TALK BACK

CROSS REFERENCE TO RELATED APPLICATIONS

This is a continuation of copending application Ser. No. 571,838 filed Jan. 19, 1984, now abandonded which is a continuation of Ser. No. 377,861 filed May 13, 1982, now U.S. Pat. No. 4,445,187 which is a continuation of Ser. No. 159,141 filed June 13, 1980 now U.S. Pat. No. 4,333,152, which is a continuation-in-part of Ser. No. 136,100 filed Mar. 31, 1980 now U.S. Pat. No. 4,305,131, which is a continuation of Ser. No. 009,533 filed Feb. 5, 1979, abandoned.

TECHNICAL FIELD OF THE INVENTION

This invention relates to television and video game systems, remote-control, voice recognition devices, branching movies, and picture/sound synchronization.

BACKGROUND OF THE INVENTION

While watching a prior-art sound movie, a viewer often experiences a vicarious sense of involvement. Such passive involvment can be changed to active participation if the movie branches, that is, if each scene is followed by one of several alternative scenes, each having different sound or different picture or both.

An example of a prior-art branching movie is shown in U.S. Pat. No. 3,960,380 titled "Light Ray Gun and Target Changing Projectors". This system uses a pair of film projectors which present two alternatives (hit or miss) at each branch point. An example of a prior-art device for interactive voice dialog is shown in U.S. Pat. No. 4,016,540. This device does not present a motion picture. An example of a prior-art video editing system is shown in U.S. Pat. No. 3,721,757. This system displays a sequence of video excerpts specified by a control program of stored videodisc addresses which comprise a sequential (not branching) movie. To change this sequence the editor alters the program. In the present invention the viewer does not alter the program.

Push-button controlled branching movies are used for computer-assisted education systems which display a lesson segment and multiple choice questions to each student. Such a system is described by R. K. Wood in Educational and Industrial TV, May 1979, pp 31–42, in an article titled "The Utah State University Videodisc Innovations Project". Depending on the student's answer, the movie branches to a segment which contains reinforcement for correct answers, or to a segment which provides remedial lessons for wrong answers.

Applying prior-art voice-recognition techniques to control prior-art branching movies would not provide a natural dialog because of the following problem: If the number of words which a viewer of any age and sex can speak and be understood by the apparatus is sufficiently large to permit a natural conversation, then prior-art voice recognition techniques are unreliable. Conversely, if the number of words is restricted to only a few words to make voice recognition reliable, then natural conversation would not result. It is also necessary for the picture to be responsive to a viewer's voice and be synchronized with the spoken reply. These problems are not addressed in the prior art.

SUMMARY OF THE INVENTION

This invention is a video game entertainment system by which one or more human viewers vocally influence the course of a video game story and conduct a simulated two-way voice conversation with screen characters in the game. Viewers talk to the screen characters and the characters talk back and talk responsively. The system thus provides an illusion of individualized and active participation in a two-way conversation which is part of a dramatic video game.

At frequent points in the game the system presents the viewer with two or more alternatives to choose among, questions to ask or remarks to make to the screen actors, or the opportunity to change the course of the action or dialog. Once the viewer has made a selection, the system addresses the appropriate audio and video frames on a random-access videodisc or other data storage device.

To simplify performing of voice recognition on the voices of different viewers, regardless of age and sex, while at the same time using a large vocabulary of computer-recognizable words, the words to be recognized at each branch point in the game are restricted to two or a few words such as "yes" and "attack". The words which a viewer may use at each branch point will often be different from words used at other branch points. The apparatus informs the viewers of what words they can use by displaying prompting messages on a handheld display device and/or with prompting words spoken by a screen actor. The display device also contains a microphone into which a viewer speaks a selected word at each branch point.

The words which a viewer can use at each branch point are displayed as prompting messages on an array of light-emitting diodes (LED) or on a liquid crystal display (LCD) panel in a hand-held unit illustrated in FIG. 13. Each set of alternative words or phrases which the viewer may speak and be understood by the speech-recognition unit are sent to each hand-held unit. If multiple viewers are interacting with the same system, their respective hand-held units can display different prompting words which are unknown to other viewers. Branching movies which are competitive games can thus be created.

So that a viewer can ask questions or make other remarks which are not responses to suggestions by a screen actor, multiple sentences can be displayed next to corresponding code words on the LCD panel. Each code word or abbreviation stands for the whole sentence or question. When a viewer speaks one of the displayed code words, the screen actor will then respond as if the whole sentence or question had been spoken by the viewer. Because the viewer selects the sentences or commands which are actually responded to, the viewer will quickly learn to disregard the fact that most of the words in the selected sentence remain unspoken. The screen actor responds to the selected code word spoken by a viewer by talking back to the viewer, or alternatively by performing some action which corresponds to the displayed code word spoken by the viewer. The actor's response not only is responsive to the spoken code word but also to the associated sentence or command.

Viewers may also talk to screen actors or cartoon characters by pressing a button or inputting a signal which when input causes a voice recording of the displayed sentence to be played or synthesized. A screen actor or cartoon then responds to the sentence or question as if the viewer had spoken it. The voice recording may be selected from several recordings of different voices so that the played voice most closely resembles the voice of the viewer.

Recordings of viewers' names may be inserted into the sound so that actors or cartoons speak to each viewer using the viewer's own name.

A precisely timed sequence of video frames and lip-synchronized audio is generated for each story line according to a prerecorded schedule of control commands which is continually updated as the game proceeds and alternative branches in the game are chosen. When each viewer/player makes a choice at a branch point in the game, a new set of commands is scheduled for execution.

The commands are of two kinds: story commands which define a branching structure of possible alternative story lines or plots, and cue commands which specify timing of video frames and audio portions. At each branch point in a network of story commands, two or more story commands may point to alternative chains or branching structures of story commands representing alternative sequences of scenes in the game. The term "scene" as used herein means a sequence of video frames presented with accompanying sound.

A scheduling unit processes a chain of story commands and assembles a schedule of cue commands specifying precisely which video frames, cartoon frames, and portions of audio are to be presented at which instant of time. A cueing unit executes these commands by generating precisely timed video and audio signals, so that a game with lip-synchronized sound is presented to the viewer.

BRIEF DESCRIPTION OF THE DRAWINGS

FIG. 6 is a detailed block diagram of control circuits 62.

FIG. 16 is a continuation of FIG. 14 for audio cue commands.

DETAILED DESCRIPTION OF THE INVENTION

Figure 1:
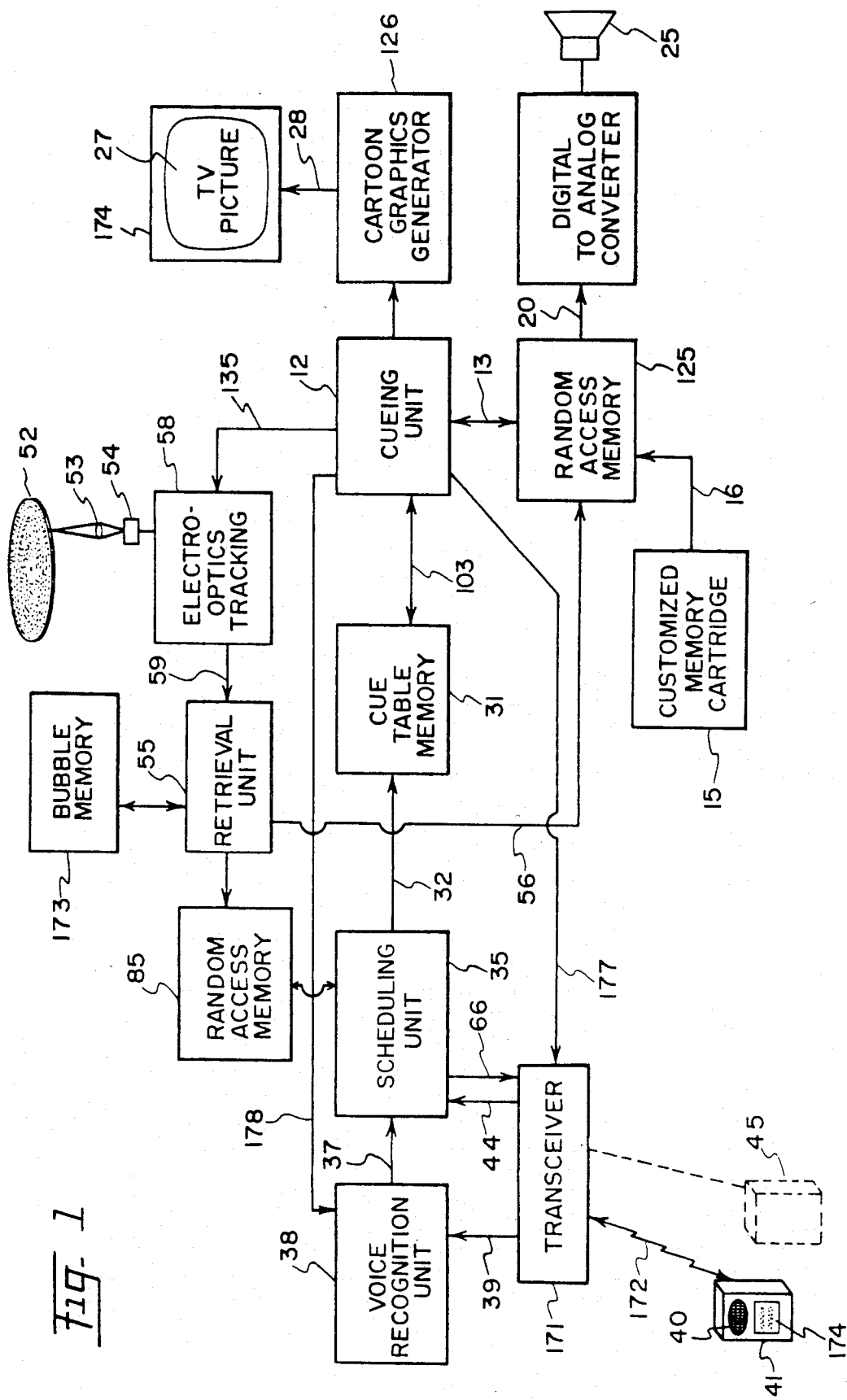
FIG. 1 is a block diagram of a microcomputer in a TV set which controls presentation of digitally generated animated cartoons in response to a viewer's voice.

Referring to FIG. 1, in one embodiment of this invention, a special-purpose microcomputer, which includes units 35, 55, 12 and other units, is part of a conventional television receiver and is connected to a conventional random-access videodisc reader which includes unit 58 for automatic seeking of track addresses and for automatic tracking of disc tracks. One or more hand-held input units 41, each containing a microphone 40 and display 174, also communicate with the microcomputer. The microcomputer in FIGS. 1 and 2 controls reading of information from videodisc 52 and processes the viewer's inputs from microphone 40. Cartridge 15 containing digitized recordings of the viewer's names may plug into the microcomputer.

Figure 2:
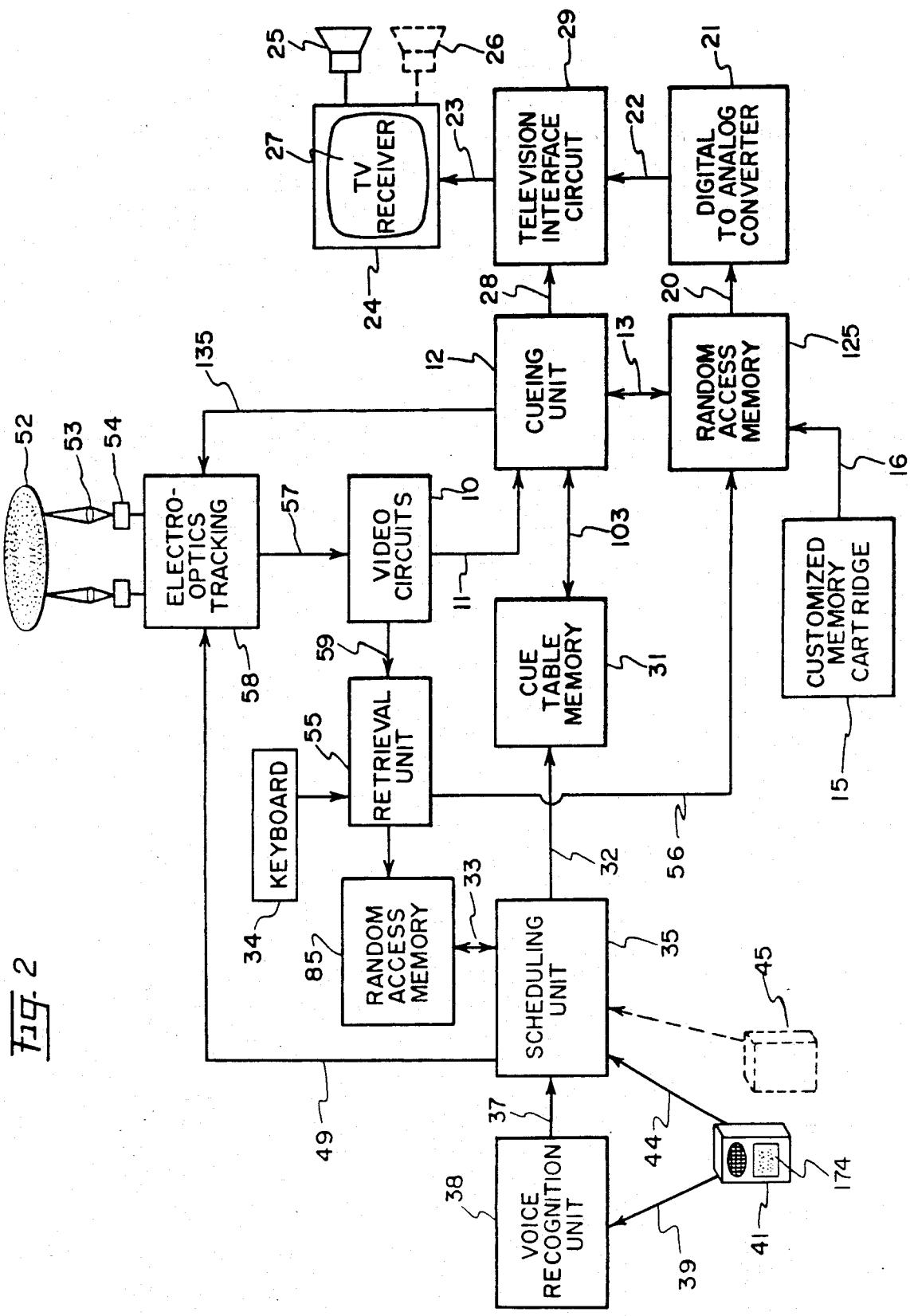
FIG. 2 is a block diagram of a microcomputer which controls presentation of prerecorded video frames in response to a viewer's voice.

The microcomputer shown in FIG. 2 includes: voice recognition unit 38, scheduling unit 35, retrieval unit 55, and cueing unit 12. The microcomputer also contains conventional random access memories 31, 85 and 125, digital-to-analog converter 21 to generate audio signal 22, conventional RF-modulator interface circuit 29 to interface with the television receiver 24, and prior-art video circuits 10 for vertical/horizontal sync separation, demodulation, burst separation and phase inversion.

Unit 58 may be one or more conventional videodisc tracking units, such as the apparatus described in U.S. Pat. Nos. 4,106,058 or 4,106,058. Read head 54 reads digitized data from disc 52 including control data, compressed audio, and data for generating animated cartoon video frames or video frames originating from a camera. An optical/laser method or capacitance method or other reading method may be used by read head 54.

In FIG. 1, digital data for generating animated catoons passes from tracking unit 58 through retrieval unit 55 to memory 125 through cueing unit 12 to cartoon graphics generator 126.

In FIG. 2, demodulated signals for video frames pass from tracking unit 58 to circuit 10 on line 57. The composite video signal for each frame passes from tracking unit 58 through video circuit 10, cueing unit 12 and interface circuit 29 to television receiver 24.

Digitized audio passes from video circuit 10 through retrieval unit 55, memory 125, digital to analog converter 21. Digitized control commands pass from circuit 10 through retrieval unit 55, memory 85, scheduling unit 35, memory 31, to cueing unit 12. Memories 85, 86 and 125 may be different portions of a common memory, but are shown separately in the drawings for clarity.

Retrieval unit 55 is a conventional peripheral input controller which stores into memory the digitally coded blocks of information obtained from videodisc 52. This information includes control data (cue commands and story commands) which unit 55 stores into memory 85 (and memory 86 in FIG. 3) for use by scheduling unit 35, and compressed audio and/or graphics data which unit 55 stores into memory 125 via line 56 for use by cueing unit 12. Magnetic bubble memory 173 may be used to store several frames of control data for more rapid access of control data by unit 55 when read head 54 is positioned for reading video or audio data.

Figure 9:
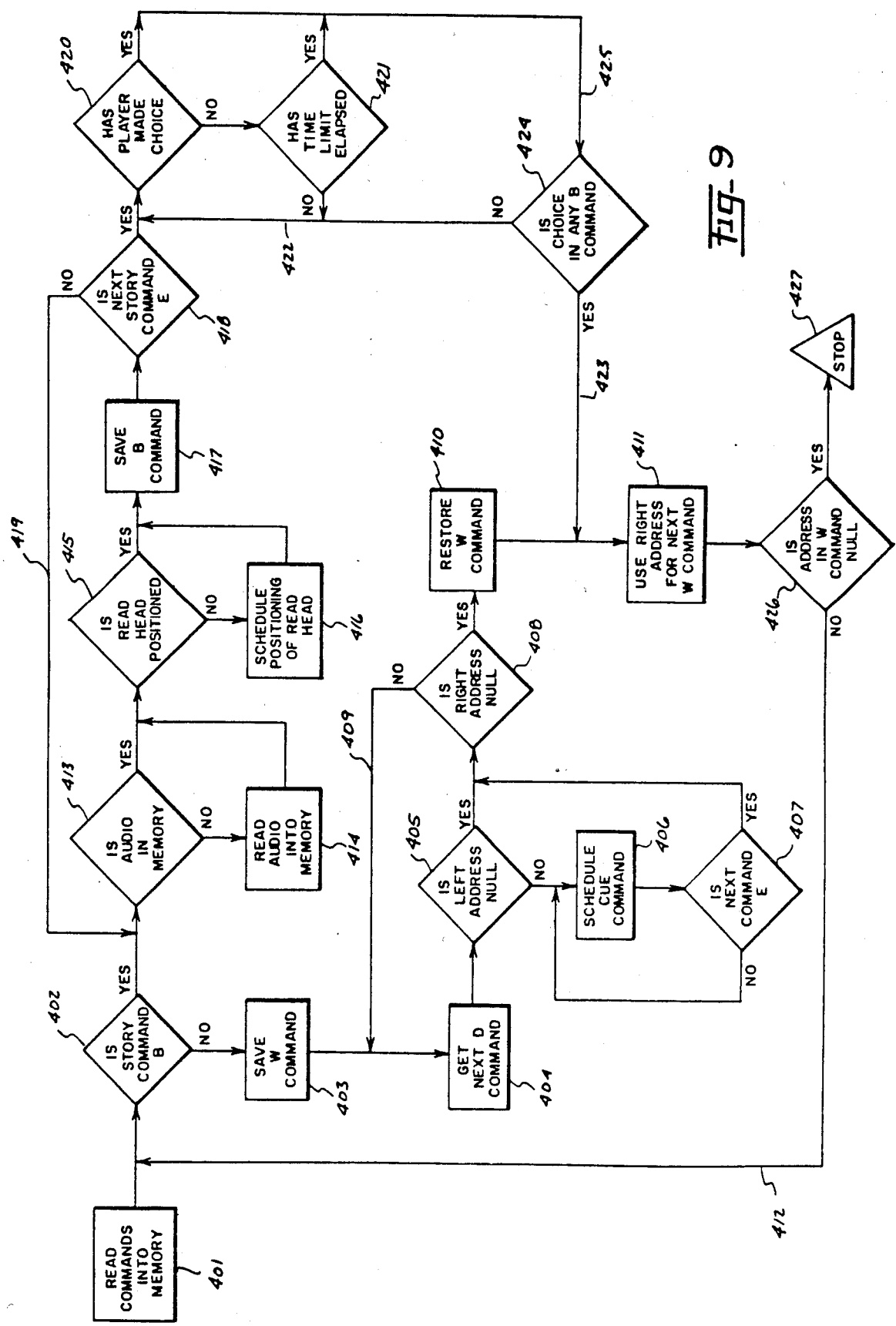
FIG. 9 is a process flowchart for scheduling unit 35.

Scheduling unit 35 (the circuit detailed in FIG. 3 or a microprocessor programmed to perform equivalent functions) is the master scheduler and has final control of the course of the game. By way of example, FIG. 9 illustrates a process for performing the main functions of scheduling unit 35. Scheduling unit 35 may request successive blocks of control information from retrieval unit 55 and output into random access memory 31 a schedule (called a cue table) of tasks for cueing unit 12 to do. Scheduler 35 repeatedly updates the cue table schedule as the game progresses. Scheduler 35 processes the choices of the human viewers which are input through one or more hand-held input units 41 and/or 45, and stores different commands into cue table 31 depending on the viewer's choices.

Figure 14:
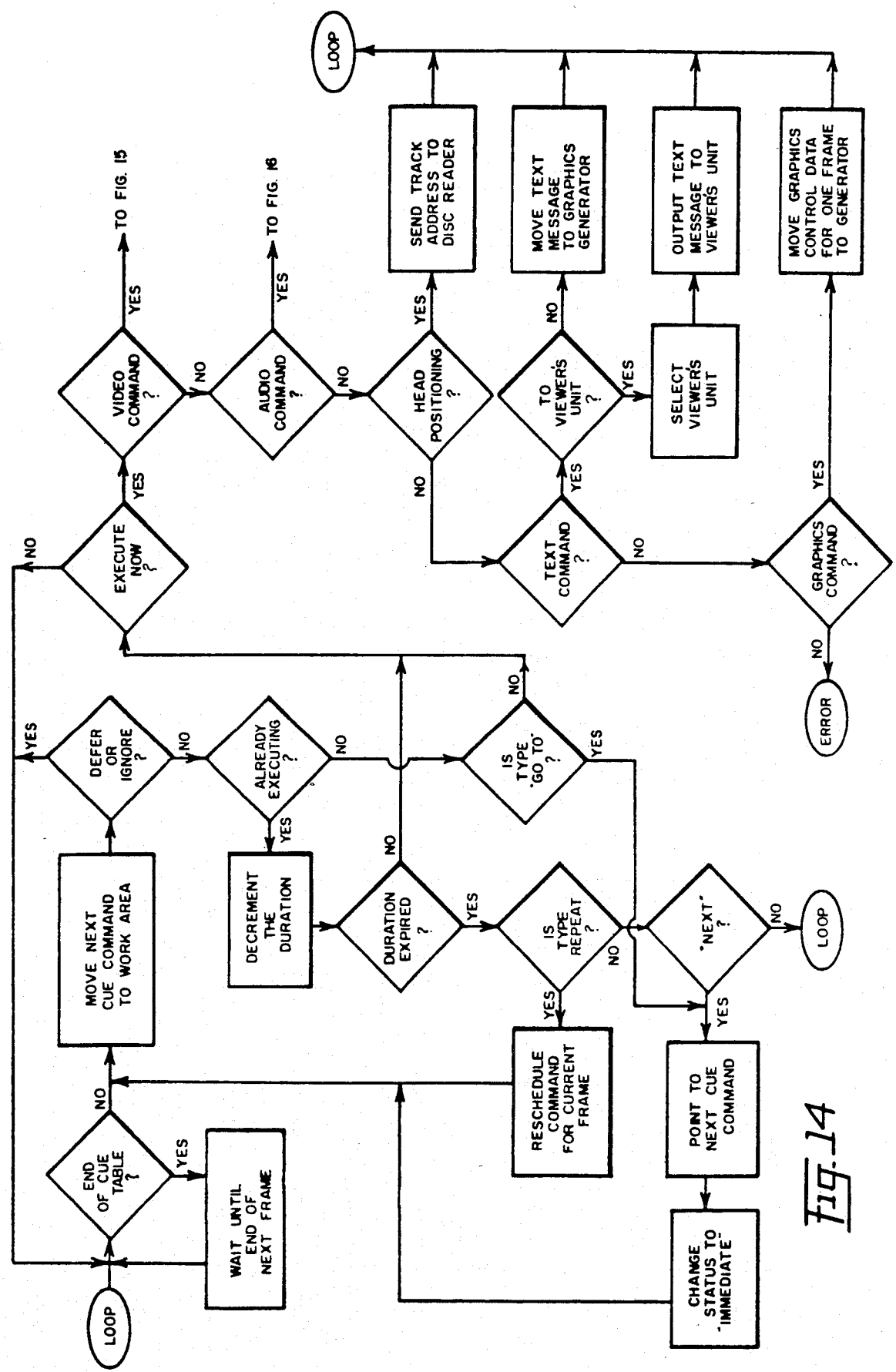
FIG. 14 is a process flowchart for cueing unit 12.
Figure 15:
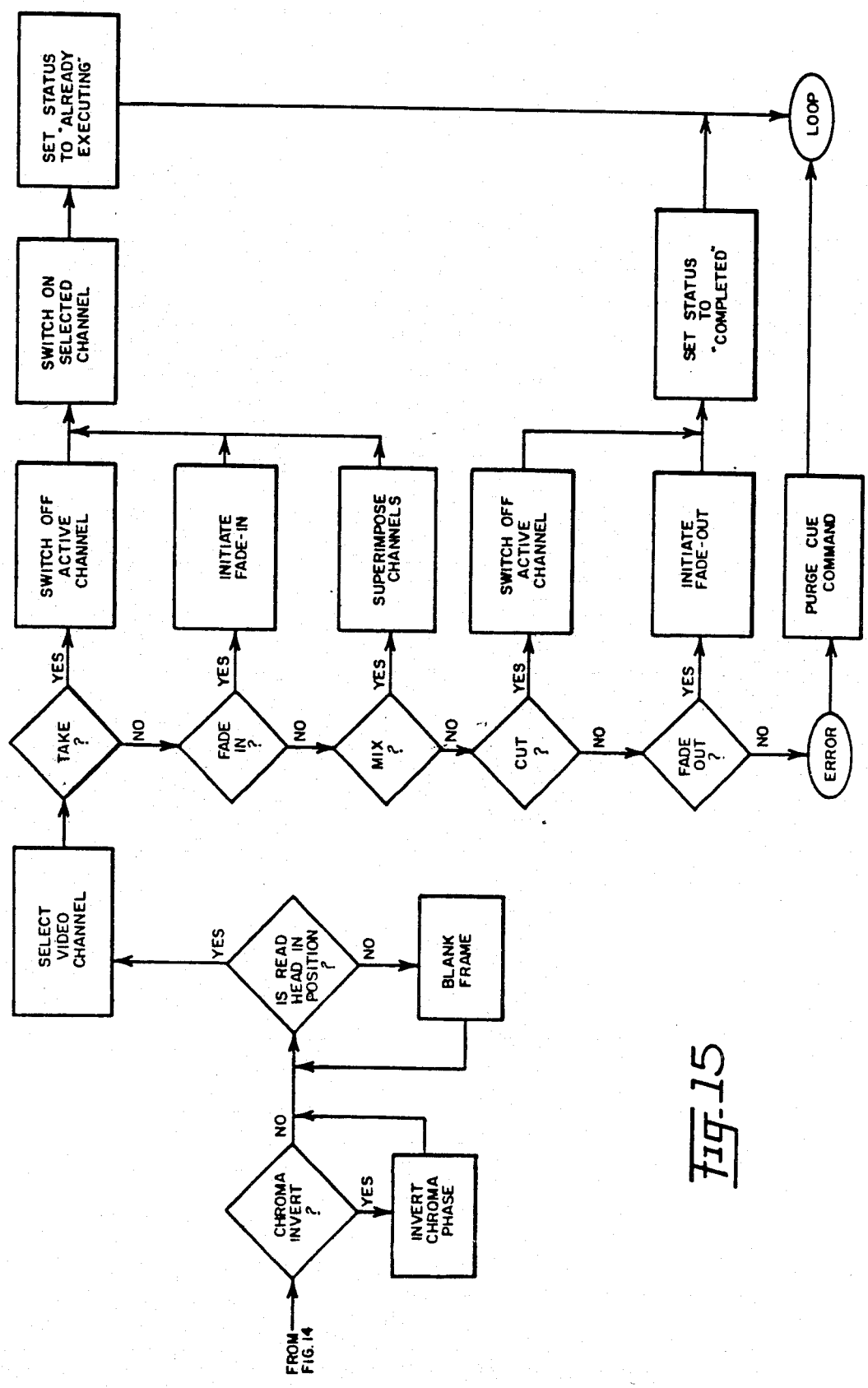
FIG. 15 is a continuation of FIG. 14 for video cue commands.

Cueing unit 12 (the circuit detailed in FIG. 4 or a microprocessor programmed to perform equivalent functions) repeatedly scans cue table 31 to get commands telling it what to do and the instant of time it should do it. By way of example, FIGS. 14–16 illustrate a process for performing cueing unit 12 functions. Cueing unit 12 edits digitized audio and other data already stored in random access memory 125 by retrieval unit 55. This editing process is directed by the commands in cue table 31 and generates a continuous sequence of output records (into register 19 in FIG. 4) containing edited, mixed, and synchronized audio in compressed digital form. Some of these edited records may contain graphics information (representing text, animation data, and/or special patterns) which are passed in cueing unit 12 to the graphics generator (block 126 in FIG. 4) which generates the video signals on line 146 representing the graphics display. Ths may consist of alphabetic characters which form titles large enough to be read from television screen 27, lines which form patterns, special shapes commonly found in video games, and/or animated cartoons. Digitized data specifying the voice characteristics of words to be recognized at the current branch point is sent by cueing unit 12 to voice recognition unit 38.

Cueing unit 12 also controls the position of read head 54 for reading video and digitized data, and processes the composite video signal on line 11 from circuit 10. Although there may be many sequences of frames which occupy consecutive tracks on disc 52 (either spiral or circular), in general there will be frequent jumps to non-adjacent tracks. This random-access movement is controlled in a conventional manner by electro-optical tracking unit 58 using track address searching.

The sequence in which tracks are accessed by each read head is specified by the commands in cue table 31. During picture intervals, cueing unit 12 scans cue table 31 for the next command or commands which specify the next track address required by read head 54.

Cueing unit 12 provides graphics generator 126 with the digital data from which generator 126 generates one or more video frames of an animated cartoon. The digital data to generate one frame may be stored in a fraction of a disc track. Alternatively, disc 52 and tracking unit 58 may be eliminated if magnetic bubble memory 173 has enough capacity to store the digital data for generating the animated cartoon game.

Figure 4:
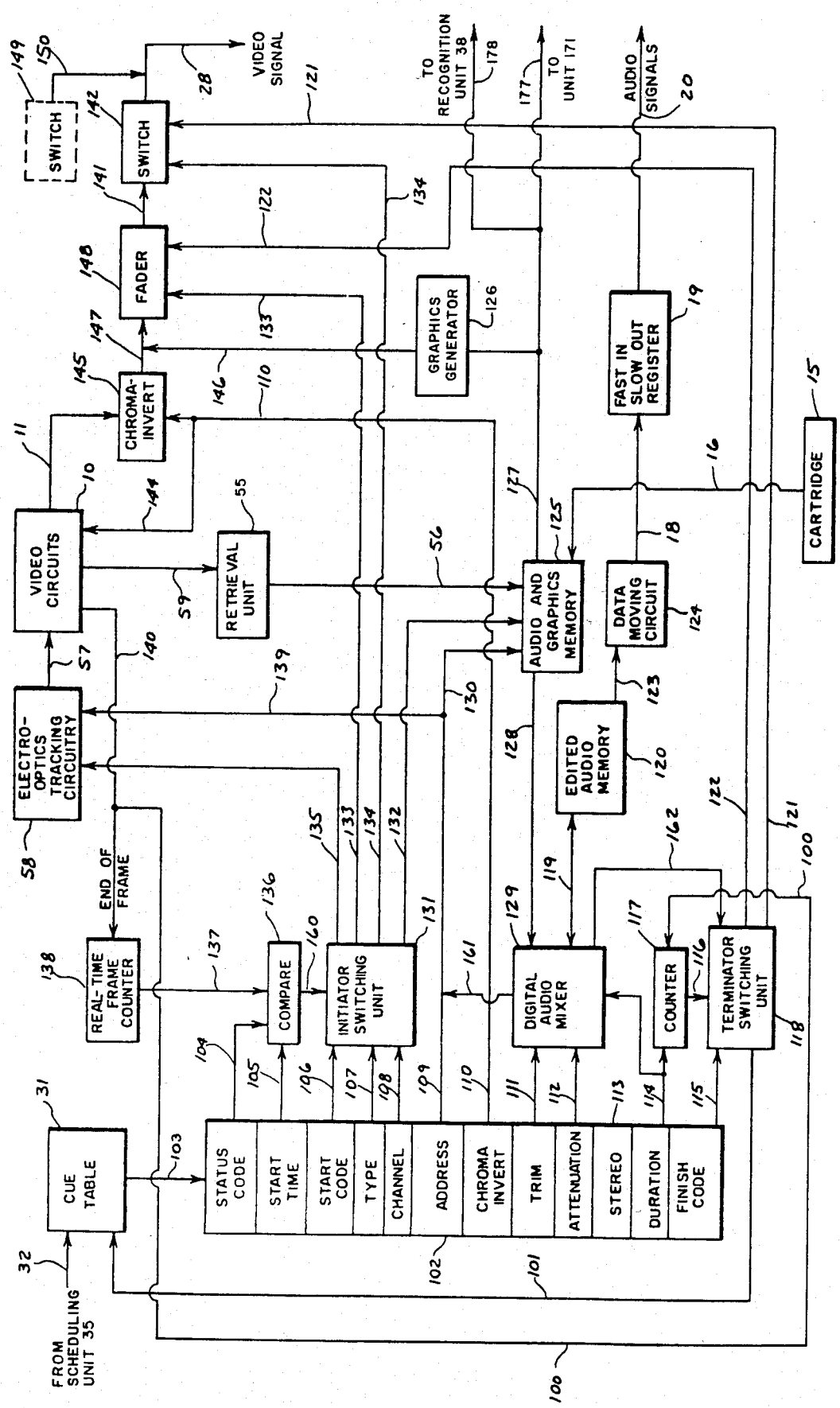
FIG. 4 is a detailed block diagram of cueing unit 12.

In an alternative embodiment of this invention shown in FIG. 2, video frames are read from disc 52 by two or more read heads 54. In this embodiment a composite video signal is passed through cueing unit 12 as shown in FIG. 4.

HOW THE INVENTION IS USED

At frequent branch points in the game the apparatus presents the viewer with two or more alternatives to choose among, predetermined remarks to make to the actors, predetermined questions to ask, or the opportunity to change the course of the action or dialog.

Figure 10:
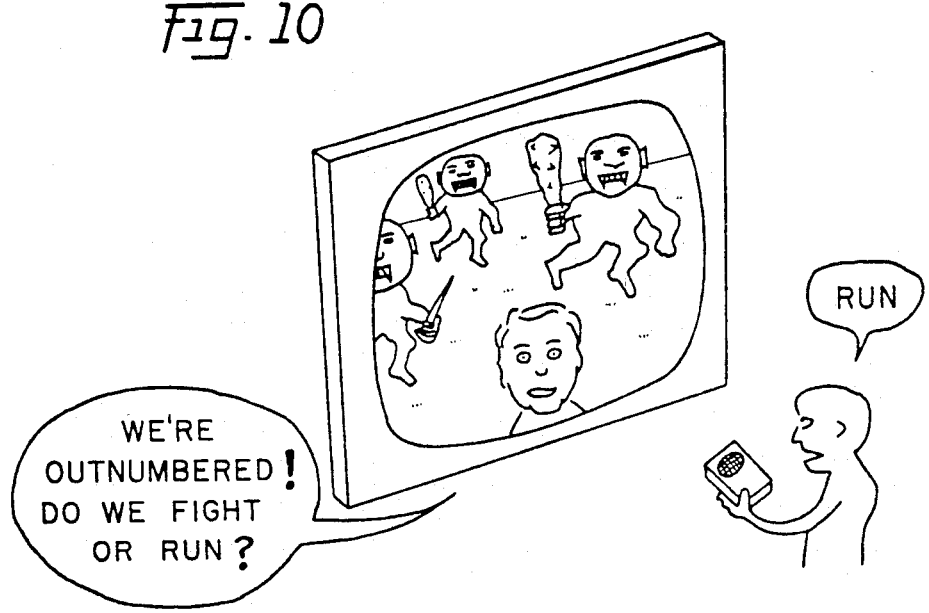
FIG. 10 is a cartoon illustrating a branch point in a game when a viewer may cause alternative story lines by speaking into a microphone.

FIG. 10 illustrates a typical branch point which leads either to a fight scene or a chase scene depending on the viewer's choice. In this illustration a chase will result. The video frames for the fight scene need not be wasted. They may be used in a later episode. Multiple choices are presented to the viewer in a sequence determined by previous choices. These may be displayed at titles on screen 27 or unit 41, or may be inferred by the viewers from the situation, or may be spoken by an actor. Such an actor, shown on the screen in FIG. 10 keeps the viewer or viewers informed on what is happening, what problems require a decision, what the alternatives are, and executes some of the actions selected by a viewer. Such an actor or actors guide the viewers into scenes which the videodisc recording or game program is capable of providing.

Figure 13:
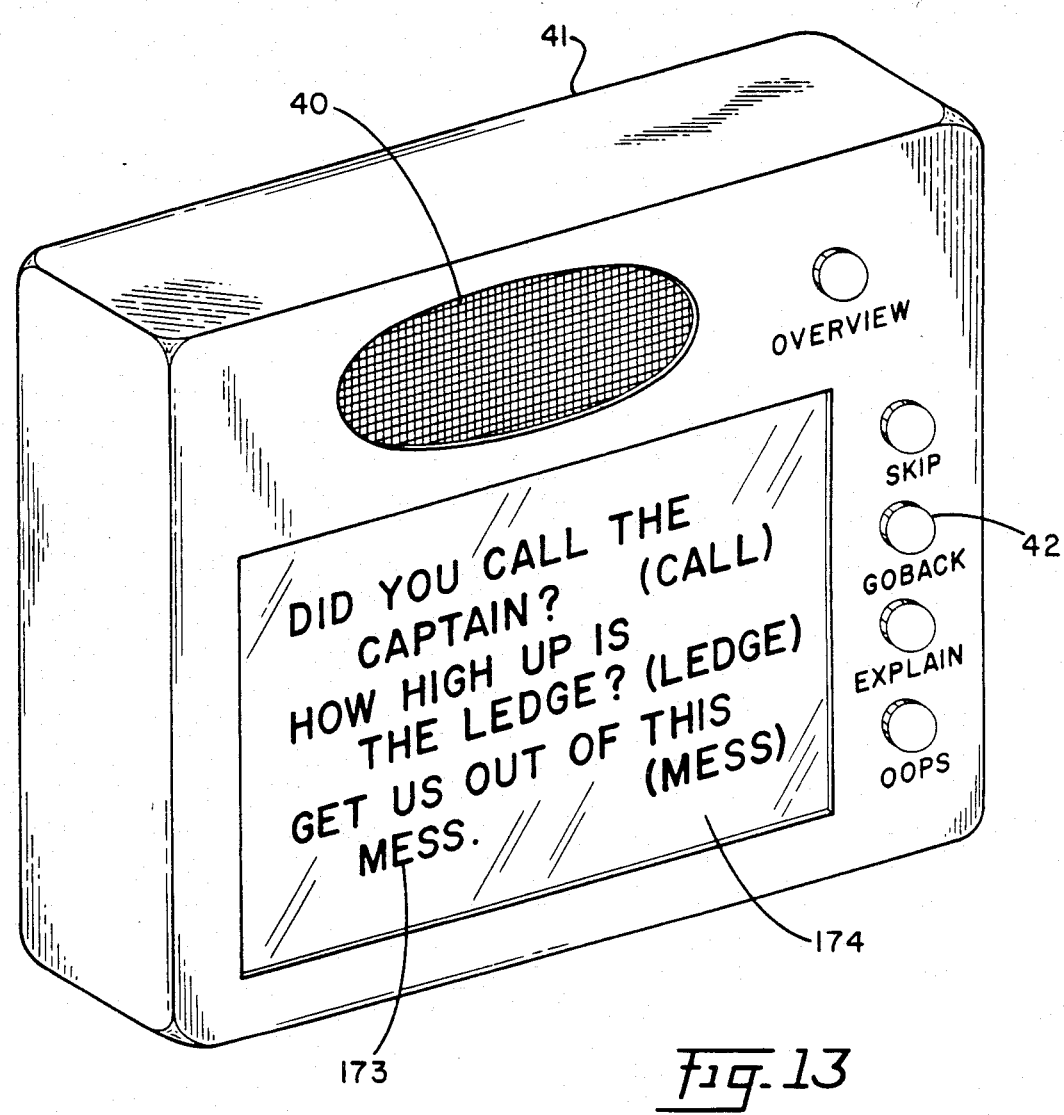
FIG. 13 is a pictorial view of a hand-held display unit through which a viewer influences the course of a branching game.

The alternative words which are acceptable to the apparatus at each branch point may be explicitly spelled out for the viewer on a readable display such as LCD panel 174 illustrated in FIG. 13. Each set of alternative words or phrases which the viewer may speak and be understood by voice recognition unit 38 are displayed on panel 174. These displayed words are the alternative responses which a viewer selects among and may include code words or abbreviations used in lieu of whole phrases suggested by a screen actor. An indicator code may be displayed on panel 174 to tell a viewer when a spoken response is expected and when a push-button input can be used.

So that a viewer may ask questions or make other remarks which are not responses to suggestions by an actor or cartoon, multiple sentences 173 may be displayed as a menu on display panel 174 next to corresponding code words which are shown in parentheses in FIG. 13. Whenever these code words appear on display 174, cueing unit 12 has primed voice recognition unit 38 to expect just that displayed set of code words. When a viewer speaks a word into microphone 40 and recognition unit 38 selects the displayed code word which most resembles the spoken word, cueing unit 12 blanks out display 174 except for the selected code word that remains on display 174. If this was not the word which the viewer intended, the viewer can press the "OOPS" button which causes cueing unit 12 to redisplay the full menu and recognition unit 38 to expect the code words again. The viewer then speaks the intended code word again.

At other branch points display 174 may show a menu of words, phrases, or sentence adjacent to corresponding push buttons or touch pads. When a viewer presses a button, a sound recording of a voice speaking the selected sentence may be played through speaker 25 as a substitute for the viewer's part of the conversation. The screen actor then "responds" as if the words in the sound recording had been spoken by the viewer. Because the viewer selects the words which are actually sounded, the viewer will quickly learn to disregard the fact that the words have been put in his mouth. Pushing a button 42 selects both a simulated verbal response to the previous scene and also a new scene which corresponds to the simulated verbal response displayed on display 174. The selected scene includes the face and voice of the actor speaking words which are responsive to the viewer's selected verbal response.

To preserve naturalness and differences in age and sex, several alternative voices, all speaking the same words, may be recorded on disc 52 or in cartridge 15 together with corresponding story commands which are processed by scheduler 35 at such branch points. Scheduler 35 then schedules cue commands which point to the digitized sound recording having preanalyzed voice characteristics which most closely resemble the characteristics of the viewer's voice as determined by voice recognition unit 38.

Referring to FIG. 13, push-buttons 42 or touch pads are provided on each hand-held unit 41 for interrupting the course of a game in various ways. The "overview" button is used when a viewer gets confused or wants a summary of recent scenes and the present situation. The "explain" button is used when a viewer does not understand the present branch point. A few sentences of explanation are displayed as text on the TV screen. This would normally be disruptive to the continuity of the game, but that is better than forcing a viewer to make a wild guess or wait in silence for a default choice. The "skip" button skips to the end of the present scene for viewers who are impatient. The "goback" button restarts the scene at the previous branch point. The "oops" button repeats the present branch point or the branch point just past. These buttons may sometimes be used for special functions which are spelled out on the adjacent panel 174.

Figure 11:
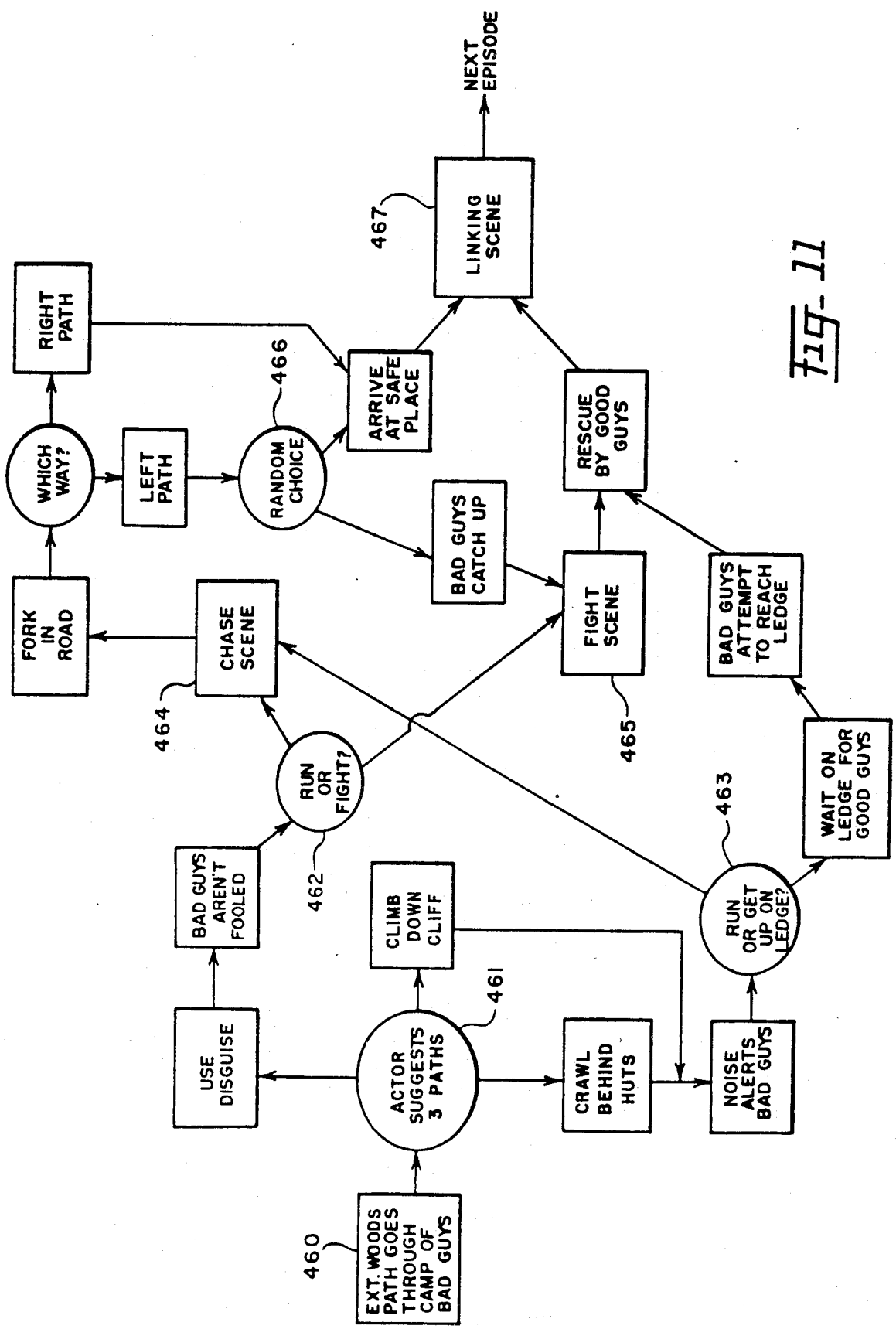
FIG. 11 is a storyboard diagram illustrating one episode in a branching game.

Planning a branching video game is more complex than planning a conventional movie. FIG. 11 shows a simplified storyboard in which the rectangles represent conventional scenes and the ovals represent branch points. Note that multiple story branches (represented by arrows) can converge on a common scene. Chase scene 464 for example, can follow either branch point 462 or branch point 463 depending on an earlier choice at branch point 461. Branch points such as 466 may be a random unpredictable choice or may depend on whether fight scene 465 has been used recently or not.

Branching games can be used for interactive conversations with videodisc recordings of famous people (either living people or historical characters played by actors). The conversations will be very one-sided of course, with the screen characters doing most of the talking. An alphanumeric keyboard 34 may be attached to retrieval unit 55 or to scheduling unit 35 for entering keywords which define the viewer's area of interest. Each user may treat the famous person as a personal acquaintance who can be consulted on specific topics whenever the user wishes. Retrieval unit 55 may use conventional data retrieval methods for locating the story commands on disc 52 which correspond to keyword entered by the user on keyboard 34.

Most of the audio on the videodisc or other data storage device would be ignored by any one user, because it falls outside of his/her area of interest. To accompany this unused audio with unused video would be wasteful of disc space which could otherwise be used for storing more compressed audio. The number of wasted video frames can be minimized by synchronizing a small inventory of video frames with multiple segments of audio. A common video frame sequence can be lip-synced to many different audio segments by skipping different video frames in each sequence. The frames to be used or skipped for each audio segment can be specified by a chain of cue commands.

DESCRIPTION OF THE VOICE RECOGNITION UNIT

The embodiments of the present invention shown in FIGS. 1 and 2 include voice recognition unit 38 which need only distinguish a few words such as "yes" and "no" at each branch point to accomplish a two-way dialog between each viewer and the apparatus. These words may be selected from a vocabulary of thousands of words and may be different for each branch point. But the number of alternative words that can be recognized at a given branch point should be limited to only a few phonetically distinct words, preferably less than seven, so that voice recognition unit 38 need not distinguish among all the words in the vocabulary but only those few alternative words at each branch point. Voice recognition devices such as described in U.S. Pat. Nos. 3,943,295 or 4,038,503 or 4,087,630 can be used for unit 38.

To minimize cost, a more simple voice recognition device can be used which recognizes two words at each branch point. Each pair of words may be chosen so that one word contains a distinctive phonetic feature such as an /f/ or /s/ phoneme while the other word does not. In the example shown in FIG. 10, the screen actor suggests that the viewer say either "fight" or "run" which are easily distinguished because "fight" begins with an /f/ phoneme. The word "fight" is used rather than "attack" to make it more easily distinguishable from "run". In this embodiment the word to be recognized can be segmented into two or more intervals of 100–600 milliseconds each, during which a count is made of zero voltage crossings. A zero count greater than a specified threshold for the first interval signals a code on line 37 to scheduler 35 that a fricative was used.

More elaborate word-recognition methods may be used by unit 38. For example, apparatus using two or more bandpass filters, fast Fourier analysis, autocorrelation, or other prior-art voice recognition methods may be used. The decision-making logic of recognition unit 38 may include decision trees, decision matrixes, best-fit template matching, and/or other methods for determining which preprogrammed combination of voice characteristics or features most resembles the sound spoken by the human viewer.

These characteristic features may include isolated words, words in continuous speech, syllables, phrases, non-word voice sounds, and/or a count of the number of phonemes or phoneme/phoneme combinations in the received sound. The presence of any sound above a given threshold may be used as a feature. If syllable recognition is used, the set of prompting words at each branch point should be planned so that each word uses a syllable or combination of syllables not found in any of the other words at that branch point.

At some branch points it may be appropriate for the viewer to speak whole phrases or speak code words which stand for whole sentences which may be displayed as a list of alternative prompting messages on TV screen 27 or display 174. Unit 38 may analyze only the first word of the phrase or may use prior-art methods of recognizing keywords in continuous speech. There is no need for unit 38 to recognize every word in a phrase, because the alternatives are restricted to only a few words or phrases at each branch point.

When cueing unit 12 sends prompting messages 173 to hand-held unit 41 via line 177, cueing unit 12 also sends digital data to voice recognition unit 38 via line 178 which specifies voice characteristics for each prompting word, abbreviation, or code word displayed on panel 174. The voice characteristics specified on bus 178 are matched against voice information derived by unit 38 from a voice signal on line 39 for each alternative word. The recognition process is thus restricted to a small set of words at each branch point.

The voice signal on line 39 is passed from microphone 40 via wire or via transceiver 171 which may use radio, infrared, or other forms of electro-magnetic or acoustic radiation 172.

FUNCTIONAL DESCRIPTION OF COMMAND PROCESSING

Control information includes story commands and cue commands. Cue commands specify what is to happen during an interval of time. Story commands represent points in time, and form chains which define each alternative story line. Branch points in the game, when a viewer can choose among alternatives, are represented by special story commands which can point to several subsequent chains of story commands. This results in a complex network of story and cue command chains illustrated in FIG. 5.

Story commands may consist of a prefix followed by one or more addresses or data. Cue commands may be fixed or variable length records which are modified and moved to cue table 31 by scheduling unit 35. Story commands will often contain pointers to cue commands. These pointers tell scheduling unit 35: "Schedule this cue command for this point in time". The time interval represented by each cue command is relative to all that has come before it. Thus if a cue command is inserted into a chain it displaces all subsequent cue commands in time. Several cue commands may begin at the same point in time (synchronized video and audio for example). The story commands pointing to such synchronized cue commands are chained together and are stored in memory 85 one after the other in any convenient order.

In contrast to cueing unit 12 which executes the cue commands at the instant their start time arrives, scheduling unit 35 processes the story commands several seconds ahead of the start time. As scheduling unit 35 processes the story commands in each chain, it does not immediately cause a video or audio event to happen. Rather, scheduler 35 schedules that event by determining when the cue command should cause the event to happen.

When scheduling unit 35 processes a story command, it follows the chain of pointers to various cue commands to determine which video frames or blocks of audio/graphics data are required during which time interval so that one or another read head 54 can be positioned in advance. The control blocks and audio for every possible choice at the next branch point should be read into memory 85 and 86 in advance of the branch point so that when the viewer makes a choice, the audio for line 22 can be generated without delay and alternative video frames can be read without repositioning either read head 54. This advance scheduling insures that there is no discontinuity or pause in either video or audio and that both remain in sync through the cue table rescheduling which scheduler 35 does after each choice by a viewer.

Figure 7:
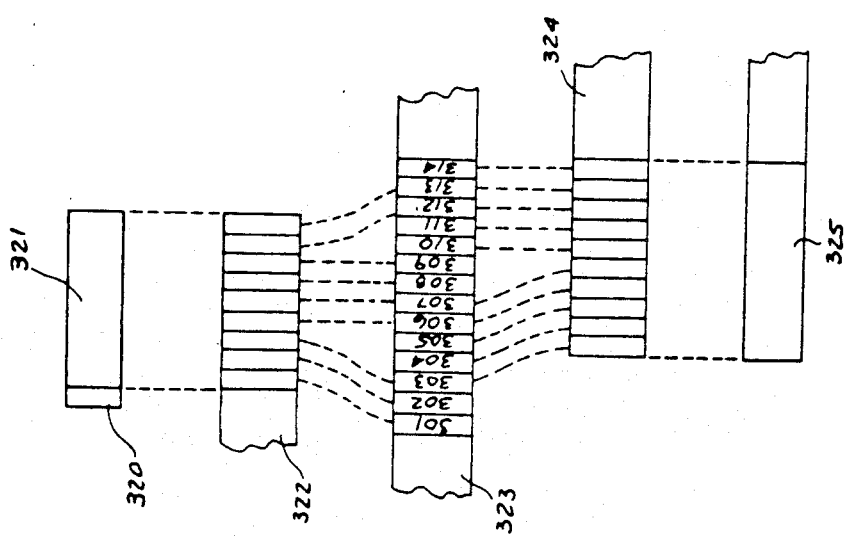
FIG. 7 illustrates how two different audio signals may be synchronized with a common set of multiple-use video frames.

Referring to FIGS. 4 and 7, in the illustrated embodiment, cueing unit 12 synchronizes different alternative audio segments with a common inventory of cartoon frames generated by video graphics generator 126. These frames show a cartoon image of a talking head of a character in the video game. Time is represented in FIG. 7 as flowing left to right. Strip 323 represents a sequence of cartoon frames as they are digitally represented in memory 125. Rectangle 301 represents one such cartoon frame. But the video frames are not generated in strip 323 sequence; rather the frames are generated first in strip 322 sequence through the frame 313. At another time the frames are generated in strip 324 sequence from frame 303 through frame 314. Audio segment 321 is synchronized with video sequence 322. Audio segment 325 is synchronized with video sequence 324. For cue commands (1 audio, 3 video) may be used for sequence 322. Three cue commands may be used for sequence 324. Unit 35 schedules generation of the first video frame 301 and audio 321 to begin in synchronism. A fractional frame 320 of audio segment 321 is automatically trimmed to synchronize audio with the video frames which are generated beginning with frame 301.

Many, perhaps hundreds, of audio segments can be lip-synced to a common inventory of generated cartoon images using this method. The digital data in memory 125 for generating each cartoon frame from compressed data (by raster-line expansion, for example), need be stored in memory 125 only once for these hundreds of different audio segments.

In embodiments of the apparatus which process camera-originated video frames, cueing unit 12 synchronizes different alternative audio segments with a common inventory of video frames which show the talking head of an actor. Strip 323 in this embodiment represents a sequence of video frames as they are recorded on the videodisc. Rectangle 301 represents one such video frame. But the frames are not read in strip 323 sequence; rather the frames are read first in strip 322 sequence through frame 313. At another time the frames are read in strip 324 sequence from frame 303 through frame 314. Audio segment 321 is synchronized with video sequence 322 and audio segment 325 is synchronized with video sequence 324.

If video frames 301 through 314 were merely repeated as many times as needed to cover all the audio, something resembling badly synchronized foreign-language dubbing would result. The reason that frames 304 and 305 are skipped in sequence 322 and frames 308 and 309 skipped in sequence 324 is to best match the available inventory of video frames to each segment of audio.

Audio also requires automatic show-time editing, especially whenever frames of audio are inserted into a continuous audio sequence. Several alternative audio inserts may be used which require slightly different timing. Also these audio inserts may be used with many different audio tracks each of which has a slightly different speech rhythm. An insert which starts at just the right instant in one sequence may cause an undesirable lag in another sequence. To correct this problem the cue command which invokes the audio insert also specifies how many eighths of frames of audio to omit at the beginning and end of the insert. Alternative audio inserts may each have different lengths which may require lengthing or shortening of the video frame sequence to preserve lip-synchronism. Each of these audio/video combinations may be specified by one pair of cue commands.

Each cue command in the illustrated embodiment is a fixed-length record of binary coded data and represents an interval of time that is scheduled to begin at the instant specified within the cue command. There is at least one cue command for each series of consecutive video frames and for each portion of audio. One scene may require hundreds of commands which are selected and stored into cue table 31 by scheduling unit 35 and executed by cueing unit 12. Cue table 31 is therefore similar to a first-in/first-out queue, except at branch points in the game when a viewer's decision may cause scheduling unit 35 to abandon several commands in cue table 31 (representing video and audio not yet presented) and to replace them with several new commands representing the altered story line.

DETAILED DESCRIPTION OF THE SCHEDULING UNIT

Figure 3:
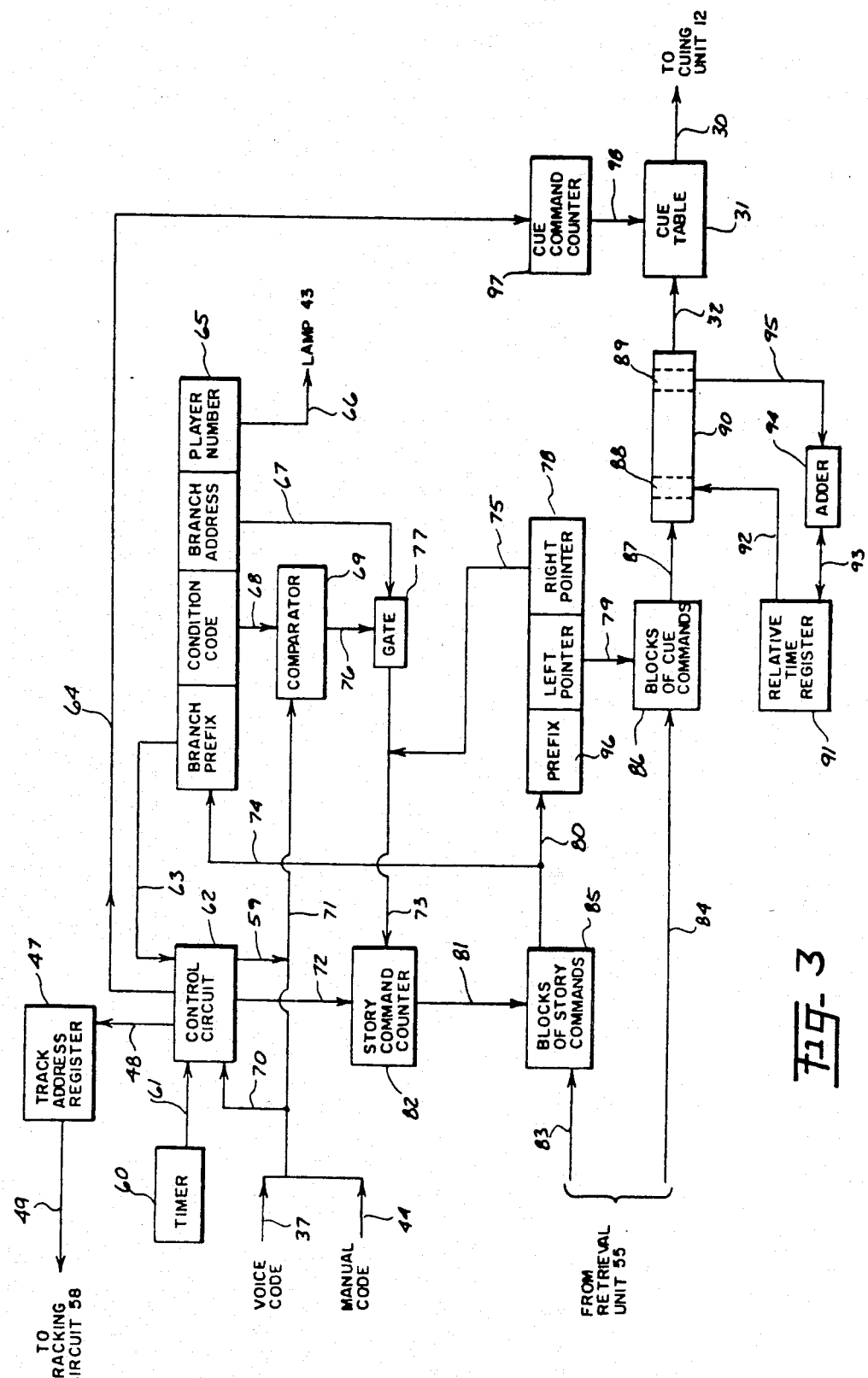
FIG. 3 is a detailed block diagram of scheduling unit 35.

The detailed structure of one embodiment of scheduling unit 35 is shown in FIG. 3. Scheduling unit 35 receives blocks of digitally coded control data from retrieval unit 55 which stores story commands into random-access memory (RAM) 85 via line 83 and stores cue commands into memory 86 via line 84. Memories 85 and 86 are shown in FIG. 1 as a single box. Memory 86 may be an extension of memory 85 but the two memories are distinguished in FIG. 3 for clarity.

The course of a game is controlled by structures of story commands in memory 85. There are at least two kinds of story commands: commands which represent branch points in the game, and pointers which point to cue commands and other story commands. Each kind of story command is read from memory 85 at a location specified by counter 82 which is incremented via line 72 by control circuit 62 so that chains of story commands in memory 85 are sequentially addressed for processing in register 65 or 78. Registers 65 and 78 may be conventional random access memory (RAM) working storage, but are shown separately in FIG. 3 for clarity.

A story command addressed by counter 82 is moved from memory 85 via bus 74 to register 65. The left-most byte (herein called the "prefix") of the story command in register 65 is moved via line 63 to control circuit 62 (to command decoder 530 in FIG. 6) which distinguishes branch commands from pointers. If the prefix on line 63 indicates a pointer, the story command is moved from memory 85 via bus 80 to register 78. The left pointer address of the story command in register 78 specifies a location of a cue command in memory 86. This cue command is addressed via line 79 and is moved via line 87 to register 90 for insertion of the start time (which will appear on line 105 in FIG. 4). The right pointer address of register 78 specifies the next story command in the chain of pointers (illustrated in FIG. 5).

Each cue command represents an interval of time which is relative to the intervals which have preceeded it. The sum of all these prior intervals is the time at which the next interval will be scheduled. This cumulative time is stored in register 91 in units of 1/30 second. When a new cue command is moved to register 90, the start-time field 88 is initialized via line 92 with the cumulative time value in register 91. Register 91 is then updated by adder 94 which adds the duration field 89 from register 90 to register 91 via lines 95 and 93. Register 91 now represents the point in time immediately following the time interval for the cue command in register 90. This cue command is moved from register 90 via line 32 to cue table 31 at the next available location indicated by counter 97 which addresses cue table 31 via line 98. Control circuit 62 then increments counter 97 via line 64 to the next available unused location or the location of an old completed cue command whose space in cue table 31 may be reused. Control circuit 62 also increments counter 82 via line 72 to address the next story command in memory 85. When the end of the block of story commands in memory 85 is reached, control circuit 62 updates track address register 47 via line 48 and requires the next block of commands from retrieval unit 55 specified to tracking unit 58 by the track address on line 49.

Each cue command may be located in memory 85 immediately following story command prefix 96 to avoid need for unnecessary pointers. This arrangement is used in FIG. 5. But in FIG. 3 the cue commands are explicitly pointed to by the left pointer in register 78 and are assigned separate memory (block 86) from the story commands (block 85) to clearly distinguish story command processing from cue command processing. The right pointer of the story command in register 78 specifies a successor story command in a chain of story commands. The right pointer in register 78 is moved via lines 75 and 73 to counter 82 which addresses via line 81 the successor story command in memory 85.

Figure 5:
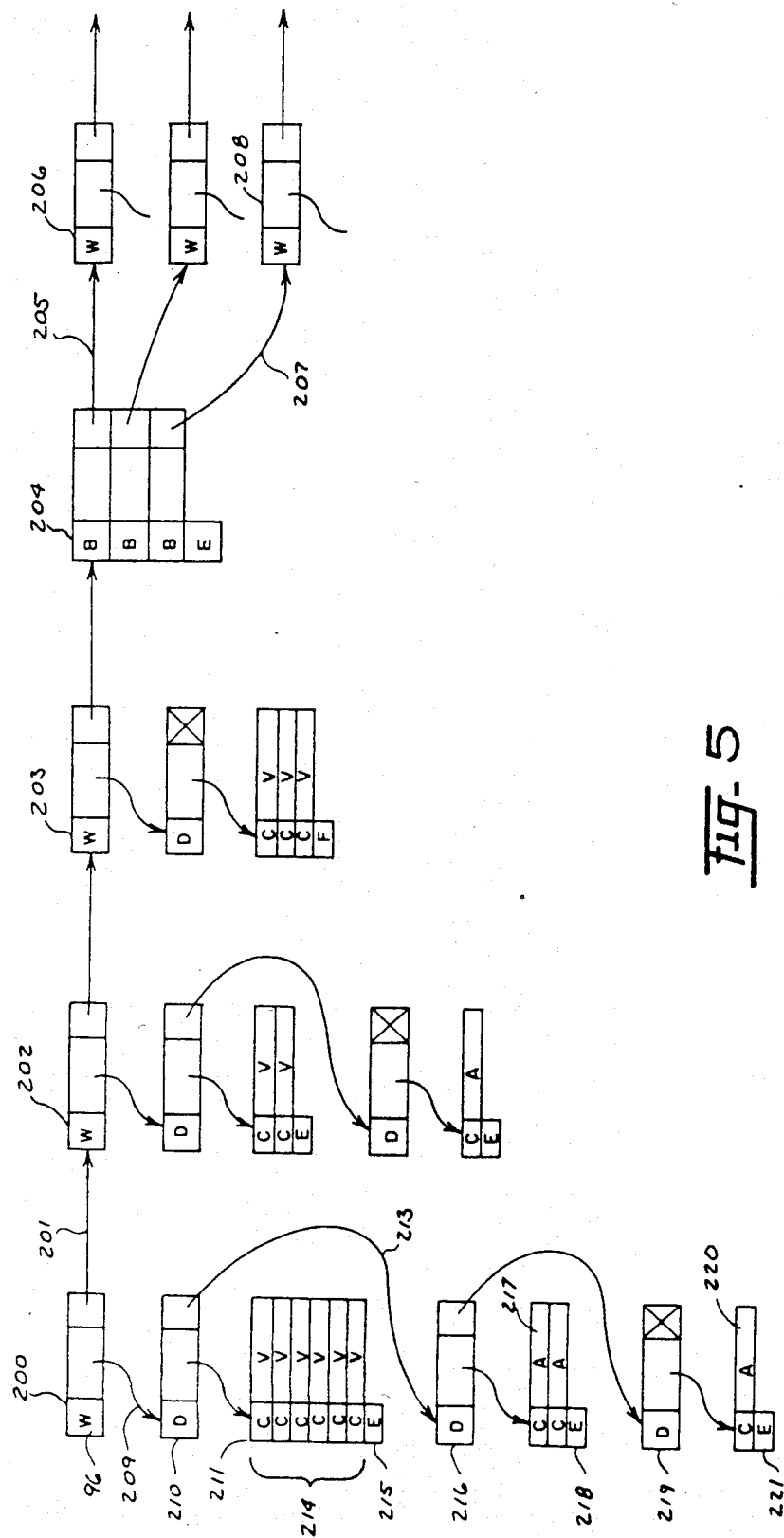
FIG. 5 illustrates a branching data structure of story and cue commands.

Referring to FIG. 5, a schematic flow diagram is shown for a typical chain or network of story commands. In contrast to the apparatus blocks in FIGS. 1–4, the blocks shown in FIG. 5 represent control data, specifically story and cue commands, and the arrows represent associative relationships between the commands. Blocks 200, 202, 203, etc. are pointer story commands which in FIG. 3 are sequentially read from memory 85 and processed in register 78. Blocks 204 are branch story commands which in FIG. 3 are processed in register 65. The various command prefixes shown in FIG. 5, such as prefix 96, indicate what kind of story command it is. The prefixes are abbreviated herein as B for Branch, W for Wait, D for Do, C for Cue, and E for End.

The branching chain shown in FIG. 5 consists of a horizontal chain of right pointers, and vertical chains of left pointers. At the end of each branch of each chain is one or more cue commands, such as video cue commands 214 and audio cue commands 217 and 220. At the end of the last episode of the game there may be a final schedule of pointers which does not branch, but instead shuts down the system.

The reason the branched chain shown in FIG. 5 is arranged in columns linked together horizontally is to emphasize an important distinction. Some events must happen sequentially (such as sequences of video frames), but other events must happen concurrently (such as synchronized audio and video). The horizontal chain at the top of FIG. 5 (blocks 200 through 206) represent events to be scheduled for sequential execution by cueing unit 12. Each vertical chain in FIG. 5 (blocks 210 through 219) represent events to be scheduled for concurrent execution by cueing unit 12. At the end of each branch there are one or more (usually several) cue commands (such as block 214) which are executed sequentially. At the end of each such sequence there is a one-byte E prefix (215, 218 and 221 in FIG. 5) which is passed via line 63 in FIG. 3 to control circuit 62 instructing it to discontinue the sequence of cue commands addressed via line 79 by the left pointer in register 78, and instead, instructs control circuit 62 to proceed to the next column in the chain specified by the right pointer in register 78 which via lines 75, 73 and 81 addresses the next story command in memory 85. For example, in FIG. 5 when all of the E prefixes (215, 218 and 221) have been reached in the scheduling of the commands in the column headed by story command 200, command 200 is returned to register 78 in FIG. 3 to obtain the right pointer (line 201 in FIG. 5) which addresses the next story command 202 from memory 85. Command 202 replaces command 200 in register 78, and processing continues with the second column in FIG. 5 (headed by block 202).

Since story commands 210, 216 and 219, which are chained together via their right pointers, each contains a D prefix (for Do), each of the chains of cue commands pointed to by their left pointers is scheduled to begin at the same point in time (specified by register 91 in FIG. 3). Typically, the video frames pointed to by cue commands 214 will be sequentially displayed, but this video will run concurrently with the audio pointed to by cue commands 217, and also concurrently with the audio pointed to by cue command 220. Command 220 may point to the digitized name of one of the viewers as spoken by the same actor show digitized voice is pointed to by commands 217. Command 220, in other words, may represent an audio insert. The video frames pointed to by commands 214 are preselected to best synchronize with audio 217 and 220 for consistency with lip movements, facial expressions, gestures, tone of voice, etc.

The W prefix (for Wait) in story command 200 instructs control unit 62 not to read command 202 into registers 65 and 78 until after all the E prefixes 215, 218, 221 subordinate to command 200 have been reached. The right pointer of the last story command in each vertical chain (such as 219) has an X in it, which is a null pointer indicating the end of the chain.

Story commands 204 in FIG. 5 represent a branch point in the story line or plot which can lead to several alternative chains of story commands (such as 206 and 208) depending on the viewer's choices. Referring again to FIG. 3, when a story command is moved from memory 85 via bus 74 to register 65 the prefix is moved via line 63 from register 65 to control circuit 62 (to decoder 530 in FIG. 6). Several types of branch commands may be used. The branch code prefix on line 63 may indicate an unconditional jump, in which case the memory address in counter 82 is replaced via lines 67 and 73 with the branch-address field from register 65.

Most branch commands will represent decision points in the game when the viewer can input a verbal response through microphone 40 (FIG. 1) or through push buttons 42 (FIG. 13). These signals are represented in FIG. 3 on lines 37 and 44 respectively as a 4-bit binary code which is passed via line 71 to comparator 69 which compares the binary code on line 71 with the condition code on line 68 from a succession of branch commands in register 65. If an inappropriate response code is present on line 71 it will not match any codes on line 68 and will therefore be ignored. If no new response is entered by the viewer, control circuit 62 will not receive the response code via line 70. Control circuit 62 decrements timer 60 which imposes a time limit (of a few seconds) on the viewer's response, i.e. while RS flip-flop 532 in FIG. 6 is set. During this period a true signal on line 531 inhibits sequential cycle controller 533 from proceeding to the next series of pointer commands so that the branch commands recycle through register 65. This loop is indicated by boxes 420 and 421 in FIG. 9. When the time limit expires in timer 60, control circuit 62 forces a default response code onto line 71 via lines 161 and 59 so that comparator 69 will detect a match with one of the branch commands in register 65.

When comparator 69 detects a match, it enables gate 77 via line 76 which causes the branch address field in register 65 to replace the address in counter 82 via lines 67 and 73. The next story command obtained from memory 85 at a location specified by the new branch address in counter 82 and bus 81, will be a new series of pointer commands for register 78 which represent the new story line appropriate to the viewer's response or lack of response.

Story commands which test previously-set conditions may be used to permit a variable number of viewers. Each viewer plays the role of a character whose prerecorded voice and impinges are bypassed if a human is playing that role. After the viewers inform the microcomputer in FIG. 1 (through a series of questions and answers) of how many viewers there are and whose is playing which role, this information can be tested frequently using branch commands which cause branch address 67 to be taken if a human viewer is playing that role, but proceed to the next sequential branch command if the role is to be played by a prerecorded image of an actor(s). If a viewer plays an active role, there will be a greater number of prompting messages for display on his unit 41. Many of these messages may require no response from the apparatus except to proceed to the next message.

DESCRIPTION OF THE SCHEDULING UNIT PROCESS

In the preceding section the structure of scheduling unit 35 was described using separate components (FIG. 3). An alternative embodiment is a programmed microprocessor which performs processing equivalent to that described in the preceeding section by performing a sequence of steps such as the process sequence shown by flowchart FIG. 9.

Referring to FIG. 9, the story commands and cue commends are read into memory during step 401. These may be read together when power is first turned on, or may be read piecemeal. Step 402 tests the prefix of the first story command for the code "B" or a numeric equivalent. When the loop indicated by line 412 encounters a B (Branch) command, control proceeds to step 413 (described below). Otherwise, control proceeds to step 403 which stores the W (Wait) command into working storage. Block 200 in FIG. 2 represents the kind of W command being processed at this point. The left address of the W command is a pointer to the D command (block 210 of FIG. 5). This D command is picked up in step 404. Step 405 then checks whether the left address of the D command points to a cue command (block 212 in FIG. 5). If it does so, control proceeds to step 406 which schedules the cue command by storing it in cue table 31 (see FIG. 1) after modifying the start time field 88 as described in the preceeding section. After step 406 has finished, step 407 checks the next cue command which immediately follows command 212 in memory 85. If the prefix is not an E (for End), control loops back to step 406 to schedule another cue command. If it is an E, control proceeds to step 408 which checks the right address of the D command got during step 404. If the right address points to the next D command (block 216 pointed to by address 213 in FIG. 5), control loops back to step 404 (via line 409) to get the next D command.

Steps 404 through 408 continue to loop in this sequence until a D command is encountered which does not have a pointer in its right address (block 219 in FIG. 5). When step 408 encounters such a D command it passes control to step 410 which restores the W command saved by step 403. The right address of this W command is used in step 411 as a pointer to the next W or B command (block 202 pointed to by address 201 in FIG. 5). But if it is an E code step 426 terminates the show by passing control to step 427 which stops the apparatus. Otherwise, control loops back to step 402 which checks the new story command picked up by step 411.

If this command is a B command like block 204 in FIG. 5, step 402 then passes control to step 413 which checks whether the audio blocks pointed to by cue commands for the current B command has been read by retrieval unit 55 into memory 125. If not, step 414 requests retrieval unit 55 to read this block of audio. Step 415 then checks whether the currently inactive read head 54 has been positioned for the video frames that will be needed if the current B command matches the choice code sent to scheduling unit 35 from hand-held input device 41. At this stage in the processing (before the viewer has made a choice) all contingencies should be prescheduled in cue table 31. If step 415 finds that the inactive read head is not yet scheduled, step 416 is performed which stores a head-positioning cue command into cue table 31. Processing of this head-positioning cue command is described below in the detailed description of the cueing unit. Step 417 then saves the B command in working storage for later use by step 411. The next byte of memory after the B command is then checked in step 418 for an E (end) code. If another B command is found, control loops back (line 419) to step 413 to process the next B command. Steps 413 through 418 continue to loop through several B commands until the E code is encountered, at which time control is passed to step 420. Step 420 checks signal bus 70 in FIG. 3 for an indication that the viewer has made a choice. If he has, control proceeds (via line 425) to step 424. If no choice has occurred, timer 60 is checked in step 421. If the time limit has elapsed, control proceeds to step 424. Otherwise control loops back (via line 422) to step 420. Loop 422 continues until either the time elapses or the viewer makes a choice. In either case, step 424 searches the B commands saved during step 417 for a match with the choice code on bus 70 in FIG. 3. If no match is found, the viewer is incorrectly making a choice which is not used at this branch point so the choice is ignored by continuing the 422 loop. When a choice is found by step 424 (which may be the default choice forced by step 421, control proceeds to step 411 which picks up the address of the next W command (block 208 pointed to by address 207 in FIG. 5).

DESCRIPTION OF THE CARTOON GRAPHICS GENERATOR

Referring to FIG. 1, the branching video game in this embodiment is presented from a sequence of animated cartoon video frames which are generated by graphics generator 126 from compressed digitized data in memory 125. This data may be read along with digitized audio from videodisc 52 and/or from other data storage devices such as magnetic bubble memory 173.

Cueing unit 12 executes cue commands in table 31 at the times specified therein by conveying to cartoon generator 126 a block or blocks of compressed binary-coded data previously stored into memory 125 by retrieval unit 55. This compressed data is used by generator 126 to generate one or more video frames which comprise part of an animated cartoon video game.

Circuitry for reading standard video, blanking, burst and sync from disc 52 is not required in this embodiment because the video signal is generated on line 146 (FIG. 4) by generator 126. The information read by conventional tracking unit 58 and retrieval unit 55 may consist entirely of compressed digitized data from which video, audio, prompting messages, and other signals are generated.

The graphics generator chip manufactured by General Instrument Corp. for their GIMINI video games is suitable for unit 126 in simple embodiments of the present invention.

Another data compression method used for storing animated cartoon data is a line-by-line string coding method in which much of the redundancy in each raster line is removed. Such a coding method is described in "Raster Scan Approaches to Computer Graphics" by Nicholas Negroponte, Computers and Graphics, Vol 2, pp 179-193, 1977. Many data compression techniques known to the art may be used in lieu of string coding. For example a catalog of 2-dimentional dot matrices may be used as described in U.S. Pat. No. 4,103,287. Each dot matrix may include lines, corners, color background, etc. from which each cartoon frame is constructed.

DETAILED DESCRIPTION OF THE CUEING UNIT

The detailed structure of one embodiment of cueing unit 12 is shown in FIG. 4. A process flowchart for cue command processing is shown in FIG. 14 which illustrates one of many sequences of steps which may be used to perform the functions of cueing unit 12. Referring to FIG. 4, each cue command is moved one at a time from cue table 31 via line 103 into buffer 102 which may consist of several bytes of conventional random-access memory (RAM) or a special purpose register. The bits of buffer 102 are arranged in fields of one or more bits which are processed via lines 104-115 in FIG. 4.

At the end of each video frame, circuit 10 sends a signal via line 140 to increment real-time frame counter 138, a conventional binary counter. This signal may be generated at the end of each field if desired. The time value in counter 138 is compared in comparator 136 to the start time bits on line 105 from buffer 102 for each cue command. If comparator 136 determines that the start time value on line 105 is greater than or equal to the real-time value on line 137 it sends an initiating signal via line 160 to initiator switching circuit 131. This initiation signal is suppressed if the 3-bit status code on line 104 indicates that the command is to be ignored. Conversely if the status line 104 indicates that the command is to be executed immediately, comparator 136 sends an immediate initiating signal via line 160 to initiator 131.

Figure 12:
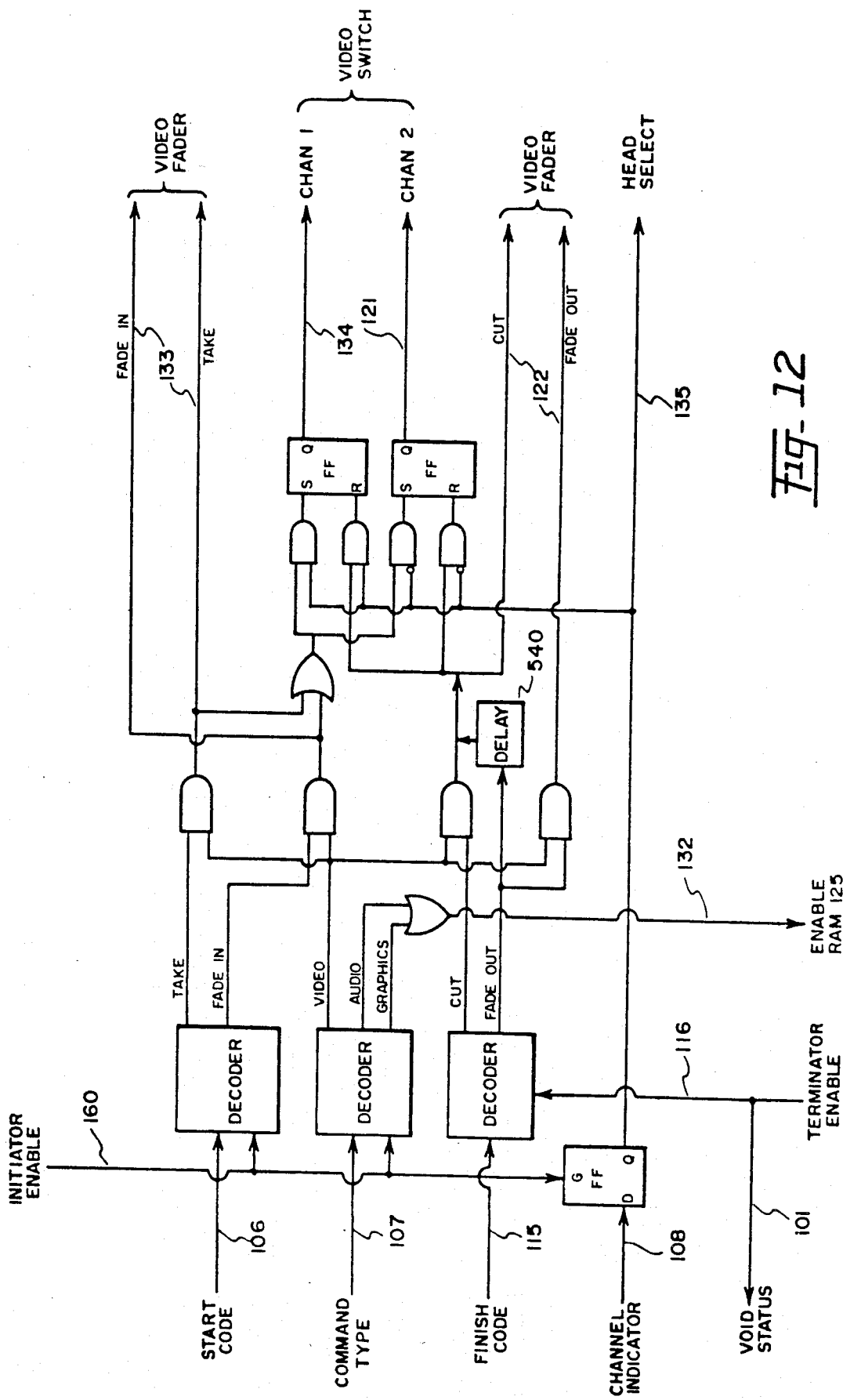
FIG. 12 is a detailed block diagram of initiator switching unit 131 combined with terminator switching unit 118.

Initiator circuit 131 (detailed in FIG. 12) generates various switching signals on line 132-135 depending on the 3-bit start code on line 106 and the 3-bit command-type code on line 107. If type code 107 indicates a video command, initiator 131 leaves audio memory control line 132 unchanged. If start code 106 indicates "take", initiator 131 enables video control lines 133 and 134 thereby switching on fader 148 and switch 142 or 149 for the channel selected by channel code 108. If start signal 106 indicates "fade in", initiator 131 signals video fader 148 via lines 133 to gradually increase the amplitude of the picture component of the composite video signal on line 141. If start signal 106 indicates "cancel", the switch 142 and fader 148 are controlled by terminator circuit 118 which is described below.

The chroma invert signal on line 110 changes whenever an odd number of video frames are skipped, to avoid loss of chroma phase lock. Signal 110 causes conventional inverter circuit 145 to shift by 180° the phase of the chroma portion of the composite video signal on line 11, and recombine the inverted chroma with the luminance portion, so that the composite signal on line 147 will continue in phase with the color subcarrier. The invert signal on line 144 causes video circuit 10 to invert the burst signal to be in phase with the subcarrier.

If type code 107 indicates a head-positioning command, control lines 133 and 134 remain unchanged for the occupied channel, so the video signal passing through blocks 58, 10, 145, 148, and 142 will not be disturbed. Tracking circuit 58 then positions the other read head to the track address specified on bus 139. However, switch 142 for the selected channel is not enabled until a "take" command is executed.

If type code 107 indicates "go to", the cue command in cue table 31 located at the relative address given on bus 109 is loaded into buffer 102 via line 103 replacing the current "go to" command and is given "immediate" status on line 104. The "go to" command is given "defer" status in cue table 31 via line 101 by terminator 118.

If type code 107 indicates an audio or graphics command, initiator 131 leaves lines 133-135 unchanged for the video channel, and enables audio/graphics memory 125 via control line 132. Memory 125 is a conventional random access memory (RAM) into which blocks of digitally coded compressed audio and graphics data are stored via line 56 by retrieval unit 55 which obtains this data from non-picture tracks on disc 52 or from magnetic bubble memory 173. Address 109 for audio and graphics commands specifies the location of data portions in memory 125.

When memory 125 is read-enabled by initiator 131 via line 132, memory 125 treats the binary address on bus 130 as a memory address of a byte of data which is then output on data bus 128 or 127 (shown separately for clarity) depending on whether the data is audio or graphics/messages.

If type code 107 indicates a graphics command, memory 125 passes a series of bytes via bus 127 to graphics generator 126 which generates video signals on line 146 corresponding to various shapes, alpha/numeric characters and lines for display on TV screen 27. The binary data on bus 127 may consist of raster coordinates, color selection, selected character/shape, color of character, orientation, brightness, direction of motion, speed and other graphics parameters. For embodiments in which animated cartoons substitute for camera-originated frames, graphics generator 126 generates video frames containing cartoon images.

If type code 107 indicates a message command, bytes in memory 125 addressed by bus 130 are passed via data bus 127 and bus 177 to display 174 in a hand-held unit 41 or 45, or are passed to voice recognition unit 38 via bus 178, depending on which region of address space is addressed by bus 130. If the address on bus 109 indicates an area in memory 125 where prompting messages/words are stored, bus 127 and bus 177 pass bytes of messages to transceiver 171 which sends the messages to a hand-held unit 41 or 45. Each hand-held unit may have a different region of address space in memory 125. The messages or code words or abbreviations displayed on panel 174 elicit from a human viewer a spoken response corresponding to one prompting word or abbreviation in the displayed message. One cue command is scheduled in cue table 31 by scheduling unit 35 to control presentation of each message at a specified point in time and for a specified duration. The messages are retrieved from videodisc 52 or from bubble memory 173 and stored into memory 125 by retrieval unit 55 together with the control commands which define the timing relationships between the messages to be displayed and the accompanying video and audio.

Cue commands which point to digital data that specifies voice characteristics are processed by cueing unit 12 like prompting message commands. The digital data in memory 125 representing voice characteristics of words to be recognized are passed via bus 178 to voice recognition unit 38. One cue command for each expected spoken word points to digital data in memory 125 which unit 38 matches against input voice information or otherwise uses to determine which of the prompting words whose voice characteristics are passed on bus 178 most resembles the voice signal on line 39.

A cue command which points to a prompting word message and a cue command which points to voice characteristics are scheduled together because they represent the same words or abbreviations. But their respective start times may be different and the prompting messages will frequently include more words than the code words expected by voice recognition unit 38.

It type code 107 indicates an audio command, each byte on bus 128 is edited by audio mixer 129 as specified by the values on lines 111-114 from the command in buffer 102. Mixer 129 increments the address on bus 130 via line 161 to access as many bytes from memory 125 as are needed to form a continuous audio signal on line 20.

Figure 8:
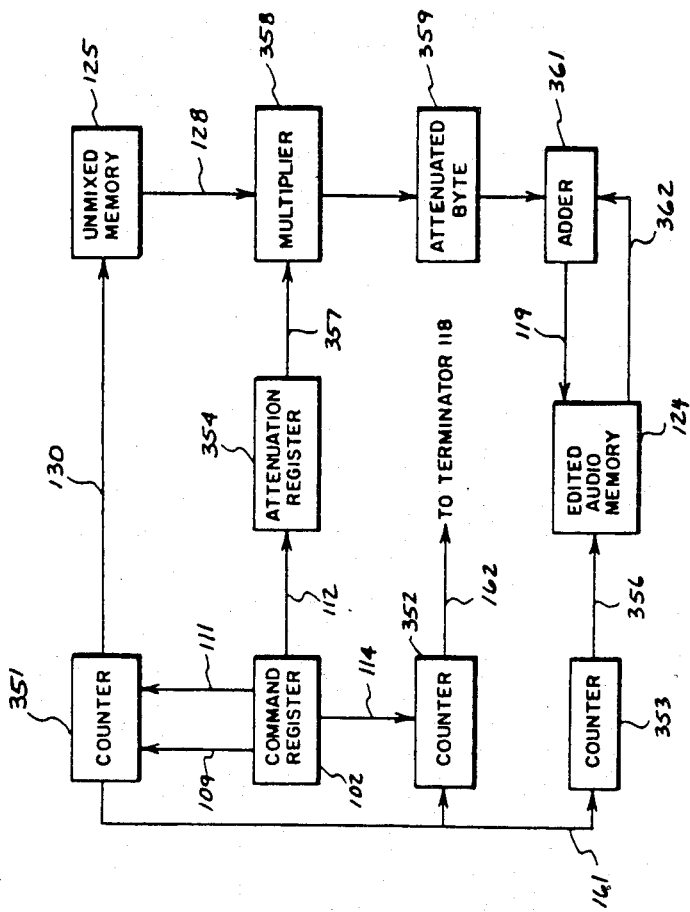
FIG. 8 is a block diagram of one type of mixer 129 for digitized audio.

The "trim" field 111 in buffer 102 indicates the amount of audio signal to be trimmed from the beginning of the audio recording by mixer 129 to achieve precise synchronization for the current combination of audio and video. Mixer 129 performs this trimming while the digitized audio is still in compressed form in memory 125. Although each block of digitized audio in memory 125 begins at a frame boundary, i.e. at 1/30 second intervals, this resolution is too coarse for precise audio editing, especially where variable-length spoken words must be inserted into dialog. The trim value on line 111 therefore represents eighths of video frames. Mixer 129 discards the amount of audio indicated by trim field 111 and stores the trimmed series of bytes into memory 120 via line 119. Memory 120 may be a continuation of conventional RAM 125 but is shown separately in FIG. 4 for clarity. Mixer 129 may also attenuate the digitized audio by multiplying each byte by the attenuation factor on line 112 from buffer 102, as shown in FIG. 8.

After mixer 129 stores the edited digitized audio bytes into memory 120 and subsequent commands perhaps have caused mixer 129 to add additional audio to the bytes in memory 120, circuit 124 moves blocks of audio data from memory 120 into fast-in slow-out register 19. Register 19 may be a conventional charge coupled device (CCD) which is filled with digitized audio via line 18 at a bit rate of about 12 megHz and readout at a sampling (byte) frequency of about 10–12 kiloHz. Register 19 may also be a conventional RAM which is readout at the 10–12 kiloHz rate.

Duration field 114 consists of a binary number which specifies the length of the time interval the current command is to be active. This number represents frame counts in video commands and eighths of frames for audio commands. For video commands counter 117 is initialized via line 114 with the duration count from buffer 102. The end-of-frame signal on line 100 decrements counter 117 each 1/30 second. When zero is reached, counter 117 signals terminator switching unit 118 via line 116 to begin the termination sequence. For audio/graphics commands the duration field in buffer 102 is moved via line 114 to mixer 129. When mixer 129 has counted down the duration value from line 114, mixer 129 signals terminator 118 via line 162.

When terminator 118 (detailed in FIG. 12) receives a signal on line 116 it begins the termination sequence specified by the finish code on line 115. Terminator 118 also voids the status code of the current command in cue table 31 via line 101 so that cueing unit 12 will not move the completed command again from cue table 31 and to indicate to scheduling unit 35 that the cue table space may be reused.

If type code 107 indicates a video command and 3-bit finish code 115 indicates "cut", terminator 118 signals video switch 142 or 149 via line 121 to switch off video signal 141 or 150. If finish code 115 indicates "fade out", terminator 118 signals fader 148 via line 122 to gradually reduce the amplitude of the picture component of the composite video signal on line 141 and then switch it off in circuit 142 (after delay 540 in FIG. 12, of 2 seconds or so). If finish code 115 indicates "repeat", lines 121 and 122 remain unchanged, but the track address on bus 139 is reinitialized to the buffer 102 value on bus 109, and counter 117 is reinitialized with the duration value on line 114. Thus the video frame sequence (or freeze frame if the duration is one) is restarted from the initial frame, except that the start signal on line 106 is not reprocessed. If finish code 115 indicates "next", the next sequential cue command in cue table 31 is loaded into buffer 102 via line 103 and given "immediate" status on line 104. The status of the command just terminated is set in cue table 31 by terminator 118 via line 101 to a "defer" status.

If type code 107 indicates an audio/graphics command, video control lines 121 and 122 remain unchanged. A "cut" signal on line 115 tells mixer 129 to stop editing digitized audio from memory 125. A "fade out" tells mixer 129 to gradually attenuate the edited audio in memory 120 just as if the attenuation value 112 were decreasing. "Repeat" and "next" are processed the same for audio/graphics commands as for video.

DESCRIPTION OF THE CARTRIDGE

Plug-in cartridge 15, shown in FIG. 4 as an extension of memory 125, may be a non-volatile addressable memory housed in a protective plastic case and used for storing digitized audio recordings of the names of the various viewers as spoken by the various actors or cartoon characters during the show. A speech synthesis unit may be used to convert the digitized names in cartridge 15 to an audio signal on line 20.

Although it would be possible to store an entire catalog of common names and nicknames on videodisc 52 purchased by the viewers, for economy reasons the catalog of names may be stored on a second videodisc which is used by each retailer with a customizing micro-computer. The retail clerk gets a list of the viewer's names from the customer. The clerk keys these names into a keyboard connected to the customizing computer which reads the selected recordings from the retailer's videodisc and stores them into the cartridge. The customer buys this customized cartridge 15 with videodisc 52.

Digitized voice recordings of each viewer's voice may also be stored into the cartridge by the retailer's computer. The words and their phoneme components may be strung together later by cueing unit 12 to form sentences in each viewer's voice whenever the viewer pushes a button 42 or speaks a code word to ask a prerecorded question or to make a prerecorded remark. Scheduler 35 selects cue commands which point to the digitized recordings of a viewer's voice in cartridge 15 memory depending on which button 42 is pressed in which hand-held unit 41 or 45.

Accompanying each block of digitized audio in cartridge 15 may be several schedules of cue commands which identify the video frame sequence which synchronizes with each instance of the spoken name in the digitized audio. Each instance of a viewer's name may require different video frames and hence a separate schedule of cue commands.

OTHER APPLICATIONS

There are other uses to which this invention may be put besides participatory amusements. The apparatus and methods herein disclosed for synchronizing multiple audio segments with a common inventory of video frames or animated cartoon frames, may be used in communication systems where the channel capacity is too limited for transmitting a synchronized picture (for example using voice grade telephone lines). The picture of a synchronized talking head may be generated in the receiving unit from general-purpose frame data stored locally on an attached videodisc or other data storage device. Only the audio and cue commands would be transmitted via the communications channel. Such a system could be used for educational lectures or news reports which change frequently, but which do not have a sufficiently large audience for video broadcasts or cable transmission. The words would change, but the face(s) doing the talking could be the same standard face in each session.

The invention may be used for interactive appliances which present a friendly talking face (an animated cartoon) for interaction with unskilled users. Such devices may be used in talking vending machines which play or synthesize various messages accompanied by an image of the digitally-generated talking face which is lip-synced with the sound as herein described.

Although I have described the preferred embodiments of my invention with a certain degree of particularity, it is understood that the present disclosure has been made only by way of example and that equivalent embodiments and numerous changes in the details of the design and the arrangement of components may be made without departing from the spirit and the scope of my invention.

I claim the following:

1. A video apparatus for simulating a voice conversation between a human viewer of the apparatus and a talking video character, the apparatus comprising:

first means for controlling reading of video frames from a record carrier means to provide a first video frame sequence associated with a plurality of alternative second video frame sequences, wherein the video frames include representations of the talking character;

second means for controlling reading of video frames from a record carrier means to provide access to at least one of said alternative second video frame sequences before the end of said first video frame sequence;

means for generating audio representations of voice sounds during said video frame sequences to provide one side of the simulated voice conversation;

means for communicating to said human viewer during said first video frame sequence a plurality of alternative words corresponding to said alternative second video frame sequences and for eliciting from said viewer a spoken response that includes one of the alternative words, thereby selecting a second video frame sequence;

voice recognition means for analyzing said spoken response and determining therefrom which selected second video frame sequence corresponds to said spoken response; and means for switching at the end of said first video frame sequence between the video frames from said first reading means to the video frames from said second reading means to provide said selected second video frame sequence accompanied by voice sounds corresponding to said selected second video frame sequence, thereby simulating a voice conversation between the talking character and the human viewer.

2. The apparatus of claim 1 wherein the apparatus is part of a video game unit.

3. The apparatus of claim 1 further comprising record carrier means in the form of a disc-shaped body having an information bearing structure arranged in concentric tracks.

4. The apparatus of claim 3 wherein said disc-shaped body is a video disc.

5. A video apparatus for simulating a voice conversation between a human viewer of the apparatus and a talking video character, the apparatus comprising:

first means for controlling reading of video frames from a record carrier means to provide a first video frame sequence;

second means for controlling reading of video frames from a record carrier means to provide access to a second video frame sequence before the end of said first video frame sequence;

means for switching at the end of said first video frame sequence between the video frames from said first reading means to the video frames from said second reading means;

means for controlling displaying of said first and second video frame sequences to include a simulated image of said video character, said first video frame sequence being accompanied by corresponding first voice sounds, thereby providing one side of a simulated voice conversation;

means for communicating to said human viewer during said first video frame sequence a plurality of alternative words corresponding to a plurality of alternative second voice sounds, and for eliciting from said viewer a spoken response that includes one of the alternative words;

voice recognition means for analyzing said spoken response and determining therefrom which of said alternative words most resembles said spoken response, thereby selecting corresponding second voice sounds; and means for controlling generation of said selected second voice sounds during said second video frame sequence, thereby simulating a voice conversation between the video character and the human viewer.

6. The apparatus of claim 5 wherein the apparatus is part of a video game unit.

7. A video apparatus for storing digital representations of a simulated voice conversation between a human and a talking video character the apparatus comprising:

a disc-shaped body storing a plurality of video frames arranged in concentric tracks, each track having a digital address on the disc; and a semiconductor memory chip storing a schedule of said digital addresses corresponding to to the sequence in which said video frames are to be read from said disc.

8. An animated cartoon video game apparatus comprising:

a video disc recording of video frame sequences having branching scenes showing an animated cartoon character encountering a situation requiring a choice of one action from a plurality of alternative actions suggested by the branching scene, each alternative action being performed by the animated cartoon character in corresponding video frame sequences recorded on the video recording;

a video disc reader;

a video display;

control means for enabling said video disc reader to read any selected video frame sequence from said video disc recording and for enabling display of a selected video frame sequence on said video display;

push-button means operated by a human game player for selecting one of said alternative actions during a branching scene;

control means for enabling switching action by said push-button means during a predetermined time interval while said video disc reader is reading a video frame sequence having a branching scene being displayed on said video display; and means responsive to timely pressing of said push-button means by the game player or failure of timely pressing during said time interval and for selectively switching said video disc reader to read from said disc recording the video frame sequence showing said animated cartoon character performing the action selected by said human player.

9. The video game apparatus of claim 8 further comprising:

means for storing numbers representing the starting and ending times for predetermined time intervals within which said switching action may be enabled; and means for periodically changing the stored numbers by fixed amounts to establish the beginning and ending of the time interval within which said switching action may occur.

10. A method of simulating a personalized voice conversation between a talking video character and a human viewer of the video character, comprising the steps of:

storing digital representations of the name of said human viewer;

displaying a first video frame sequence associated with a plurality of second video frame sequences and accompanied by first voice sounds, the video frame sequences including picture representations of a talking video character;

communicating to the human viewer during said first video frame sequence a plurality of verbal expressions to elicit a spoken response which resembles one of said verbal expressions each said verbal expression corresponding to a second video frame sequence in said plurality thereof;

analyzing said spoken response electronically to determine which selected verbal expression in said plurality thereof resembles said spoken response;

displaying the second video frame sequence corresponding to said selected verbal expression accompanied by second voice sounds; and generating as a third voice sound the name of said human viewer as a function of said digital representations during said first or second video frame sequence, thereby personalizing a simulated voice conversation between the human and the talking video character.

11. The method of claim 10 wherein said simulated voice conversation is part of a video game.

12. The method of claim 10 wherein said video character is displayed as an animated cartoon.

13. The method of claim 10 wherein said video character is displayed as a moving image of a screen actor.

14. The method of claim 10 wherein said verbal expressions are communicated to the human viewer as voice sounds.

15. The method of claim 10 wherein said verbal expressions are communicated to the human viewer as displayed words.

16. A method of simulating a personalized voice conversation between a talking video character and a human viewer of the video character comprising the steps of:

storing digital representations of the name of said human viewer;

displaying a first video frame sequence including picture representations of a talking video character accompanied by a first voice sound associated with a plurality of second voice sounds;

communicating to the human viewer during said first video frame sequence a plurality of verbal expressions to elicit a spoken response which resembles one of said verbal expressions, each said verbal expression corresponding to a second voice sound in said plurality thereof;

analyzing said spoken response electronically to determine which selected verbal expression in said plurality thereof resembles said spoken response;

displaying said first video frame sequence again as a second video frame sequence, thereby repeating said talking video character;

presenting the second voice sound corresponding to said selected verbal expression; and generating as a third voice sound the name of said human viewer as a function of said digital representations during said first or second video frame sequence, thereby personalizing a simulated voice conversation between the human and the talking video character.

17. A method of simulating a voice conversation between an animated video picture and a human viewer of the picture, comprising the steps of:

displaying as a first video frame sequence a simulated image of a talking face;

presenting during said first video frame sequence a plurality of voice sounds suggesting a choice between a chase and a fight, so as to elicit a spoken response corresponding to either a chase or a fight;

displaying as a second video frame sequence a simulated image of a chase or a fight depending on said spoken response; and presenting voice sounds corresponding to said chase or fight during said second video frame sequence thereby simulating a voice conversation between the human and the talking face.

18. The method of claim 17 wherein said simulated voice conversation is part of a video game.

19. A method of simulating a voice conversation between an animated video picture and a human viewer of the picture, comprising the steps of:

displaying as a first video frame sequence a simulated image of a talking face;

presenting during said first video frame sequence a plurality of voice sounds suggesting a choice between at least two alternative paths, so as to elicit a spoken response corresponding to one path among the alternative paths;

displaying as a second video frame sequence a simulated image of said talking face selecting one path among said alternative paths depending on said spoken response; and presenting voice sounds corresponding to said one selected path during said second video frame sequence, thereby simulating a voice conversation between the human and the talking face.

20. The method of claim 19 wherein said simulated voice conversation is part of a video game.

21. A method of simulating a voice conversation between a talking face in a video picture and a human viewer of the picture, comprising the steps of:

displaying a plurality of video frames as a first video frame sequence including a talking face accompanied by first voice sounds;

communicating to the human viewer during said first video frame sequence a plurality of prompting words to elicit a spoken response which resembles one of the prompting words, said prompting words corresponding to alternative second voice sounds;

analyzing said spoken response electronically to determine which selected prompting word in said plurality thereof resembles said spoken response, thereby selecting the corresponding second voice sound;

displaying said video frames again as a second video frame sequence, thereby repeating said talking face; and presenting said selected second voice sound with said second video frame sequence, thereby simulating a voice conversation between the talking face and the viewer.

22. The method of claim 21 wherein said simulated voice conversation is part of a video game.

23. A method of simulating a personalized voice conversation between a talking video character and a human viewer of the video character, comprising the steps of:

storing digital representations of the name of said human viewer;

displaying a first video frame sequence associated with a plurality of second video frame sequences and accompanied by first voice sounds, the video frame sequences including picture representations of a talking video character;

communicating to the human viewer during said first video frame sequence a first plurality of verbal expressions, each verbal expression corresponding to a second video frame sequence in said plurality thereof;

receiving from said viewer a response signal corresponding to a selected verbal expression in said plurality of verbal expressions;

displaying the second video frame sequence corresponding to said selected verbal expression accompanied by second voice sounds; and synthesizing as a third voice sound the name of said human viewer as a function of said digital representations during said first or second video frame sequence, thereby personalizing a simulated voice conversation between the human and the talking video character.

24. The method of claim 23 wherein said simulated voice conversation is part of a video game.

25. The method of claim 23 wherein said video character is displayed as an animated cartoon.

26. The method of claim 23 wherein said video character is displayed as a moving image of a screen actor.

27. The method of claim 23 wherein said verbal expressions are communicated to the human viewer as voice sounds.

28. The method of claim 23 wherein said verbal expressions are communicated to the human viewer as displayed words.

29. A method of simulating a personalized voice conversation between a talking video character and a human viewer of the video character, comprising the steps of:

storing digital representations of the name of said human viewer;

displaying a first video frame sequence including picture representations of a talking video character accompanied by a first voice sound associated with a plurality of second voice sounds;

communicating to the human viewer during said first video frame sequence a first plurality of verbal expressions each verbal expression corresponding to a second voice sound in said plurality thereof;

receiving from said viewer a response signal corresponding to a selected verbal expression in said plurality of verbal expressions;

displaying said first video frame sequence again as a second video frame sequence, thereby repeating said talking video character;

presenting the second voice sound corresponding to said selected verbal expression; and synthesizing as a third voice sound the name of said human viwer as a function of said digital representations during said first or second video frame sequence, thereby personalizing a simulated voice conversation between the human and the talking video character.

30. The method of claim 29 wherein said simulated voice conversation is part of a video game.

31. The method of claim 29 wherein said video character is displayed as an animated cartoon.

32. The method of claim 29 wherein said video character is displayed as a moving image of a screen actor.

33. The method of claim 29 wherein said verbal expressions are communicated to the human viewer as voice sounds.

34. The method of claim 29 wherein said verbal expressions are communicated to the human viewer as displayed words.

35. A method of simulating a voice conversation between a talking face in a video picture and a human viewer of the picture, comprising the steps of:

displaying a plurality of video frames as a first video frame sequence including a talking face accompanied by first voice sounds;

communicating to the human viewer during said first video frame sequence a plurality of prompting words corresponding to alternative second voice sounds;

receiving from said viewer a response signal corresponding to a selected prompting word in said plurality thereof, thereby selecting the corresponding second voice sound;

displaying said video frames again as a second video frame sequence, thereby repeating said talking face; and presenting said selected second voice sound with said second video frame sequence, thereby simulating a voice conversation between the talking face and the viewer.

36. A video game method for controlling display of video frames from a video recording having a plurality of tracks, comprising the steps of:

displaying as a first video frame sequence an animated cartoon character encountering a situation requiring a choice of one action from a plurality of alternative actions suggested by the first video frame sequence, each alternative action being performed by the animated cartoon character recorded on the video recording as a corresponding second video frame sequence;

receiving from a human player a signal specifying a selected action in said plurality thereof, thereby selecting the corresponding second video frame sequence;

jumping to the video recording track containing the first video frame of said selected second video frame sequence; and displaying said selected second video frame sequence, thereby showing the animated cartoon character performing the action selected by said human player.

* * * * *